(12) United States Patent
Chen

(10) Patent No.: US 8,953,257 B1
(45) Date of Patent: Feb. 10, 2015

(54) IMAGE CAPTURING LENS SYSTEM AND IMAGE CAPTURING DEVICE

(71) Applicant: Largan Precision Co., Ltd., Taichung (TW)

(72) Inventor: Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/036,843

(22) Filed: Sep. 25, 2013

(30) Foreign Application Priority Data

Aug. 19, 2013 (TW) .............................. 102129618 A

(51) Int. Cl.
*G02B 13/18* (2006.01)
*G02B 3/02* (2006.01)
*G02B 9/60* (2006.01)
*G02B 13/00* (2006.01)

(52) U.S. Cl.
CPC .................................. *G02B 13/0045* (2013.01)
USPC .......................................... 359/714; 359/766

(58) Field of Classification Search
CPC .................................. G02B 9/60; G02B 13/18
USPC .......................................... 359/714, 763, 766
See application file for complete search history.

(56) References Cited

U.S. PATENT DOCUMENTS

2012/0087019 A1* 4/2012 Tang et al. .................... 359/714

\* cited by examiner

*Primary Examiner* — Alicia M Harrington
(74) *Attorney, Agent, or Firm* — Tim Tingkang Xia, Esq.; Morris, Manning & Martin, LLP

(57) ABSTRACT

An image capturing lens system includes five non-cemented lens elements with refractive power, in order from an object side to an image side, a first lens element, a second lens element, a third lens element, a fourth lens element and a fifth lens element. The first lens element with positive refractive power has a convex object-side surface in a paraxial region thereof. The second lens element has negative refractive power. The third lens element has positive refractive power. The fourth lens element with negative refractive power has a concave object-side surface in a paraxial region thereof. The fifth lens element with refractive power has a concave image-side surface in a paraxial region thereof, wherein both of the surfaces thereof are aspheric, and at least one inflection point is formed on the image-side surface thereof. The image capturing lens system has a total of five lens elements with refractive power.

18 Claims, 16 Drawing Sheets

IMAGE CAPTURING LENS SYSTEM AND IMAGE CAPTURING DEVICE

RELATED APPLICATIONS

This application claims priority to Taiwan Application Serial Number 102129618, filed Aug. 19, 2013, which is incorporated by reference herein in its entirety.

BACKGROUND

1. Technical Field

The present disclosure relates to an image capturing lens system and image capturing device. More particularly, the present disclosure relates to a compact image capturing lens system and image capturing device applicable to portable electronic products.

2. Description of Related Art

In recent years, with the popularity of mobile products having camera functionalities, the demand for miniaturized optical systems has been increasing. The sensor of a conventional photographing camera is typically a CCD (Charge-Coupled Device) image sensor or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system employed in a portable electronic product mainly adopts a four-element lens structure. Due to the popularity of mobile products with high-end specifications, such as smart phones and tablet personal computers, the pixel and image-quality requirements of the compact optical systems have increased rapidly. However, the conventional four-piece lens structure cannot satisfy the requirements of the compact optical systems.

On the other hand, another conventional compact optical system utilizes five-element lens structure for enhancing the image quality and resolution of the optical system, but the arrangement of refractive powers of the optical system is usually not well-balanced. As a result, it is not favorable for correcting the aberration and reducing the sensitivity, and cannot satisfy the compact optical systems featuring high image quality.

Accordingly, there is an increasing demand for image capturing lens system and image capturing device featuring better image quality and good aberration correction ability. Moreover, the refractive powers of the image capturing lens system and image capturing device also need to be balanced.

SUMMARY

According to one aspect of the present disclosure, an image capturing lens system includes five non-cemented lens elements with refractive power, in order from an object side to an image side, a first lens element, a second lens element, a third lens element, a fourth lens element and a fifth lens element. The first lens element with positive refractive power has a convex object-side surface in a paraxial region thereof. The second lens element has negative refractive power. The third lens element has positive refractive power. The fourth lens element with negative refractive power has a concave object-side surface in a paraxial region thereof. The fifth lens element with refractive power has a concave image-side surface in a paraxial region thereof, wherein an object-side surface and the image-side surface of the fifth lens element are aspheric, and the fifth lens element has at least one inflection point formed on the image-side surface of the fifth lens element. The image capturing lens system has a total of five lens elements with refractive power. When a focal length of the second lens element is f2, a focal length of the first lens element is f1, a focal length of the third lens element is f3, a central thickness of the third lens element is CT3, and a central thickness of the fourth lens element is CT4, the following conditions are satisfied:

$|f2|<f1<f3$; and $1.35<CT3/CT4<5.0$.

According to another aspect of the present disclosure, an image capturing device includes the image capturing lens system according to the aforementioned aspect and an image sensor.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
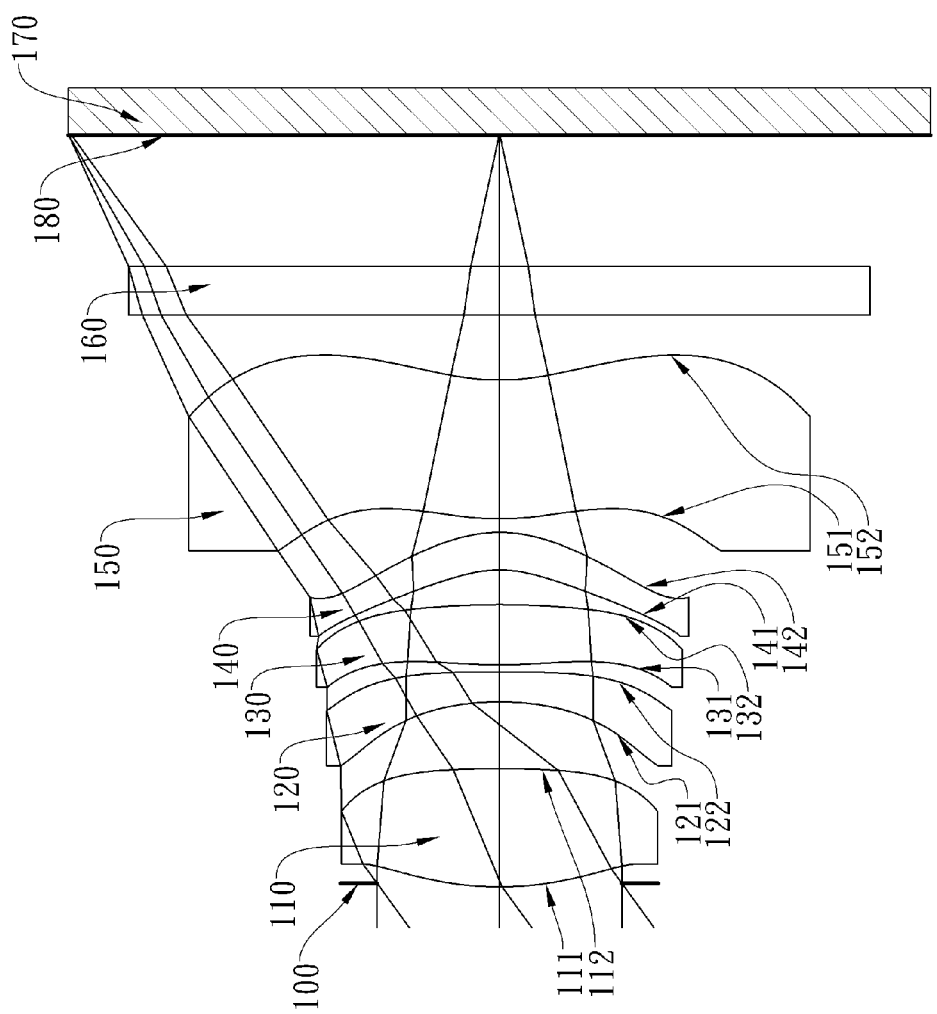
FIG. 1A is a schematic view of an image capturing lens system according to the 1st embodiment of the present disclosure.

An image capturing lens system includes five non-cemented lens elements with refractive power, in order from an object side to an image side, a first lens element, a second lens element, a third lens element, a fourth lens element and a fifth lens element. The image capturing lens system has a total of five lens elements with refractive power.

The first lens element, the second lens element, the third lens element, the fourth lens element, and the fifth lens element are five non-cemented lens elements with refractive power. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the image capturing lens system. Therefore, the image capturing lens system of the present disclosure provides five non-cemented lens elements for improving the problem generated by the cemented lens elements.

The first lens element has positive refractive power, so that it provides the image capturing lens system with the positive refractive power as it needs to be and is favorable for reducing the total track length of the image capturing lens system. The first lens element has a convex object-side surface in a paraxial region thereof, so that it is favorable for effectively reducing the total track length of the image capturing lens system.

The second lens element has negative refractive power, so that it is favorable for correcting the aberration generated from the first lens element with positive refractive power. The second lens element can have a concave image-side surface in a paraxial region thereof, wherein the image-side surface of the second lens element has at least one convex shape in an off-axis region thereof. Therefore, it is favorable for correcting the aberration of the off-axis.

The third lens element has positive refractive power, so that it is favorable for balancing the positive refractive power of the first lens element so as to reduce the system sensitivity. The third lens element can have a convex object-side surface in a paraxial region thereof, wherein the object-side surface of the third lens element has at least one concave shape in an off-axis region thereof. Therefore, it is favorable for effectively correcting the aberration of the off-axis.

The fourth lens element has negative refractive power, so that it is favorable for effectively correcting the Petzval sum so as to reduce image curvature. The fourth lens element has a concave object-side surface in a paraxial region thereof and can have a convex image-side surface in a paraxial region thereof, so that the astigmatism of the image capturing lens system can be corrected.

The fifth lens element with refractive power can have a convex object-side surface in a paraxial region thereof and has a concave image-side surface in a paraxial region thereof, so that it is favorable for reducing the back focal length so as to keep the image capturing lens system compact. Furthermore, the fifth lens element has at least one inflection point formed on the image-side surface of the fifth lens element. Therefore, it is favorable for reducing the angle at which the incident light projects onto an image sensor from the off-axis so as to improve the responding efficiency of the image sensor.

When a focal length of the second lens element is f2, a focal length of the first lens element is f1, and a focal length of the third lens element is f3, the following condition is satisfied: $|f2|<f1<f3$. Therefore, it is favorable for correcting the aberration and the system sensitivity resulted from the refractive powers of the first lens element and the third lens element.

When a central thickness of the third lens element is CT3, and a central thickness of the fourth lens element is CT4, the following condition is satisfied: $1.35<CT3/CT4<5.0$. Therefore, it provides favorable moldability and homogeneity for plastic lens elements during the injection molding process. Preferably, the following condition is satisfied: $1.5<CT3/CT4<3.0$.

When a sum of the central thicknesses from the first through fifth lens elements is $\Sigma CT$, and an axial distance between the object-side surface of the first lens element and the image-side surface of the fifth lens element is Td, the following condition is satisfied: $0.67<\Sigma CT/Td<0.90$. Therefore, it is favorable for keeping the image capturing lens system more compact so as to maintain a compact size.

When an axial distance between the second lens element and the third lens element is T23, an axial distance between the third lens element and the fourth lens element is T34, and the central thickness of the third lens element is CT3, the following condition is satisfied: $0.15<(T23+T34)/CT3<0.80$. Therefore, it is favorable for manufacturing and assembling the lens elements so as to increase the manufacturing yield rate.

When a central thickness of the fifth lens element is CT5, and the sum of the central thicknesses from the first through fifth lens elements is $\Sigma CT$, the following condition is satisfied: $0.25<CT5/\Sigma CT<0.45$. Therefore, it provides favorable moldability and homogeneity for plastic lens elements during the injection molding process so as to keep the image capturing lens system compact.

The aforementioned image capturing lens system further includes a stop, such as an aperture stop, disposed between an imaged object and the second lens element, wherein an axial distance between the stop and an image plane is SL, and an axial distance between the object-side surface of the first lens element and the image plane is TTL, the following condition is satisfied: $0.8<SL/TTL<1.2$. Therefore, it is favorable for balancing the telecentricity and wide-angle feature.

When a curvature radius of the object-side surface of the second lens element is R3, and a curvature radius of the image-side surface of the second lens element is R4, the following condition is satisfied: $-2.0<(R3+R4)/(R3-R4)<1.5$. Therefore, it is favorable for correcting the aberration of the image capturing lens system.

When a focal length of the image capturing lens system is f, and a focal length of the fourth lens element is f4, the following condition is satisfied: $-0.6<f/f4<0$. Therefore, it is favorable for effectively correcting the Petzval sum of the image capturing lens system so as to reduce the image curvature.

When a distance in parallel with an optical axis from an axial vertex on the object-side surface of the second lens element to a maximum effective diameter position on the object-side surface of the second lens element is Sag21 (When the distance towards the object side of the image capturing lens system is negative, and when the distance towards the image side of the image capturing lens system is positive.), a central thickness of the second lens element is CT2, the following condition is satisfied: $-3.0<\text{Sag21}/\text{CT2}<-0.3$. Therefore, the surface shape of the second lens element will not be excessively curved and the thickness of the second lens element will be proper so as to keep the arrangement of the lens elements more compact.

When an axial distance between the first lens element and the second lens element is T12, and the central thickness of the second lens element is CT2, the following condition is satisfied: $1.0<\text{T12}/\text{CT2}<2.5$. Therefore, it provides favorable moldability and homogeneity for plastic lens elements during the injection molding process so as to increase the manufacturing yield rate.

When the focal length of the first lens element is f1, and the focal length of the second lens element is f2, the following condition is satisfied: $-1.8<\text{f1}/\text{f2}<-1.1$. Therefore, it is favorable for avoiding resulting in excessive spherical aberration and correcting the aberration generated from the first lens element.

When the focal length of the third lens element is f3, and the focal length of the first lens element is f1, the following condition is satisfied: $1.1<\text{f3}/\text{f1}<2.0$. Therefore, it is favorable for effectively reducing the system sensitivity.

According to the image capturing lens system of the present disclosure, the lens elements can be made of plastic or glass material. When the lens elements are made of glass material, the distribution of the refractive power of the image capturing lens system can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image capturing lens system can be effectively reduced.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, an aperture stop can be configured as a front stop or a middle stop. A front stop disposed between an imaged object and the first lens element can provide a longer distance between an exit pupil of the system and an image plane and which improves the image-sensing efficiency of the image sensor. A middle stop disposed between the first lens element and the image plane is favorable for enlarging the field of view of the system and thereby provides a wider field of view for the same.

According to the image capturing lens system of the present disclosure, when the lens element has a convex surface, it indicates that the surface is convex in the paraxial region thereof; and when the lens element has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

The present image capturing lens system can be optionally applied to zoom optical systems. According to the image capturing lens system of the present disclosure, the image capturing lens system is featured with good correction ability and high image quality, and can be applied to 3D (three-dimensional) image capturing applications, in products such as digital cameras, mobile devices, tablets, wearable devices and other portable electronic image systems.

According to the present disclosure, an image capturing device is provided. The image capturing device includes the image capturing lens system according to the aforementioned image capturing lens system of the present disclosure, and an image sensor located on an image plane of the aforementioned image capturing lens system. Therefore, it is favorable for properly distributing the refractive powers of the image capturing lens system so as to correct aberration and reduce the system sensitivity.

According to the above description of the present disclosure, the following 1st-8th specific embodiments are provided for further explanation.

1st Embodiment

Figure 1B:
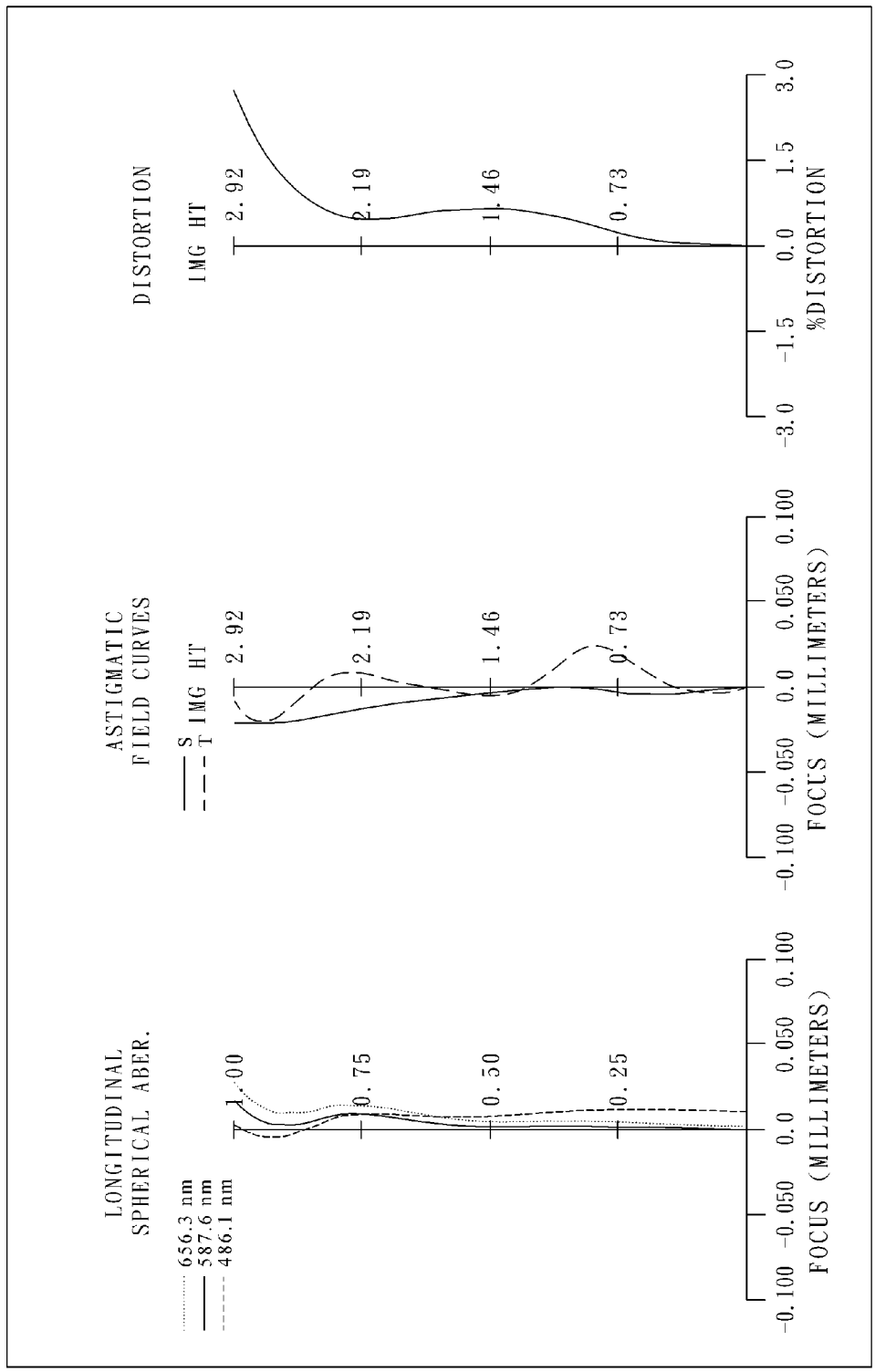
FIG. 1B shows spherical aberration curves, astigmatic field curves and a distortion curve of the image capturing lens system according to the 1st embodiment.

FIG. 1A is a schematic view of an image capturing lens system according to the 1st embodiment of the present disclosure. FIG. 1B shows spherical aberration curves, astigmatic field curves and a distortion curve of the image capturing lens system according to the 1st embodiment. In FIG. 1A, the image capturing lens system includes five non-cemented lens elements with refractive power, in order from an object side to an image side, an aperture stop 100, the first lens element 110, the second lens element 120, the third lens element 130, the fourth lens element 140, the fifth lens element 150, an IR-cut filter 160, an image plane 180 and an image sensor 170.

The first lens element 110 with positive refractive power has a convex object-side surface 111 in a paraxial region thereof and a convex image-side surface 112 in a paraxial region thereof, and is made of plastic material. The object-side surface 111 and the image-side surface 112 of the first lens element 110 are aspheric.

The second lens element 120 with negative refractive power has a concave object-side surface 121 in a paraxial region thereof and a concave image-side surface 122 in a paraxial region thereof, and is made of plastic material. The object-side surface 121 and the image-side surface 122 of the second lens element 120 are aspheric, wherein the image-side surface 122 of the second lens element 120 has at least one convex shape in an off-axis region thereof.

The third lens element 130 with positive refractive power has a convex object-side surface 131 in a paraxial region thereof and a convex image-side surface 132 in a paraxial region thereof, and is made of plastic material. The object-side surface 131 and the image-side surface 132 of the third lens element 130 are aspheric, wherein the object-side surface 131 of the third lens element 130 has at least one concave shape in an off-axis region thereof.

The fourth lens element 140 with negative refractive power has a concave object-side surface 141 in a paraxial region thereof and a convex image-side surface 142 in a paraxial region thereof, and is made of plastic material. The object-side surface 141 and the image-side surface 142 of the fourth lens element 140 are aspheric.

The fifth lens element 150 with positive refractive power has a convex object-side surface 151 in a paraxial region thereof and a concave image-side surface 152 in a paraxial region thereof, and is made of plastic material. The object-side surface 151 and the image-side surface 152 of the fifth lens element 150 are aspheric. Furthermore, the fifth lens element 150 has at least one inflection point formed on the image-side surface 152 thereof.

The IR-cut filter 160 is made of glass and located between the fifth lens element 150 and the image plane 180, and will not affect the focal length of the image capturing lens system. Moreover, the image capturing lens system further includes an image sensor 170 located on the image plane 180.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the image capturing lens system according to the 1st embodiment, when a focal length of the image capturing lens system is f, an f-number of the image capturing lens system is Fno, and half of the maximal field of view of the image capturing lens system is HFOV, these parameters have the following values: f=3.90 mm; Fno=2.35; and HFOV=36.0 degrees.

In the image capturing lens system according to the 1st embodiment, when an axial distance between the first lens element 110 and the second lens element 120 is T12, and a central thickness of the second lens element 120 is CT2, the following condition is satisfied: T12/CT2=2.27.

In the image capturing lens system according to the 1st embodiment, when an axial distance between the second lens element 120 and the third lens element 130 is T23, an axial distance between the third lens element 130 and the fourth lens element 140 is T34, and a central thickness of the third lens element 130 is CT3, the following condition is satisfied: (T23+T34)/CT3=0.70.

In the image capturing lens system according to the 1st embodiment, when the central thickness of the third lens element 130 is CT3, and a central thickness of the fourth lens element 140 is CT4, the following condition is satisfied: CT3/CT4=1.60.

In the image capturing lens system according to the 1st embodiment, when a central thickness of the fifth lens element 150 is CT5, and a sum of the central thicknesses from the first through fifth lens elements (110-150) is ΣCT, the following condition is satisfied: CT5/ΣCT=0.36.

In the image capturing lens system according to the 1st embodiment, when the sum of the central thicknesses from the first through fifth lens elements (110-150) is ΣCT, an axial distance between the object-side surface 111 of the first lens element 110 and the image-side surface 152 of the fifth lens element 150 is Td, the following condition is satisfied: ΣCT/Td=0.76.

In the image capturing lens system according to the 1st embodiment, when an axial distance between the aperture stop 100 and an image plane 180 is SL, and an axial distance between the object-side surface 111 of the first lens element 110 and the image plane 180 is TTL, the following condition is satisfied: SL/TTL=1.00.

In the image capturing lens system according to the 1st embodiment, when a distance in parallel with an optical axis from an axial vertex on the object-side surface 121 of the second lens element 120 to a maximum effective diameter position on the object-side surface 121 of the second lens element 120 is Sag21, the central thickness of the second lens element 120 is CT2, the following condition is satisfied: Sag21/CT2=−2.18.

In the image capturing lens system according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=−0.95.

In the image capturing lens system according to the 1st embodiment, when a focal length of the first lens element 110 is f1, the following condition is satisfied: f1=3.25 (nm).

In the image capturing lens system according to the 1st embodiment, when a focal length of the second lens element 120 is f2, the following condition is satisfied: |f2|=2.82 (nm).

In the image capturing lens system according to the 1st embodiment, when a focal length of the third lens element 130 is f3, the following condition is satisfied: f3=3.76 (nm).

In the image capturing lens system according to the 1st embodiment, when the focal length of the image capturing lens system is f, and a focal length of the fourth lens element 140 is f4, the following condition is satisfied: f/f4=−0.12.

In the image capturing lens system according to the 1st embodiment, when the focal length of the first lens element 110 is f1, and the focal length of the second lens element 120 is f2, the following condition is satisfied: f1/f2=−1.15.

In the image capturing lens system according to the 1st embodiment, when the focal length of the third lens element 130 is f3, and the focal length of the first lens element 110 is f1, the following condition is satisfied: f3/f1=1.16.

The detailed optical data of the 1st embodiment are shown in Table 1 and the aspheric surface data are shown in Table 2 below.

TABLE 1

1st Embodiment
f = 3.90 mm, Fno = 2.35, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.024 | | | | |
| 2 | Lens 1 | 2.147 | ASP | 0.802 | Plastic | 1.544 | 55.9 | 3.25 |
| 3 | | −8.658 | ASP | 0.454 | | | | |
| 4 | Lens 2 | −1.881 | ASP | 0.200 | Plastic | 1.650 | 21.4 | −2.82 |
| 5 | | 70.236 | ASP | 0.050 | | | | |
| 6 | Lens 3 | 3.185 | ASP | 0.409 | Plastic | 1.544 | 55.9 | 3.76 |

TABLE 1-continued

1st Embodiment
f = 3.90 mm, Fno = 2.35, HFOV = 36.0 deg.

| Surface # | | Curvature Radius | | Thickness | Material | Index | Abbe # | Focal Length |
|---|---|---|---|---|---|---|---|---|
| 7 | | −5.471 | ASP | 0.236 | | | | |
| 8 | Lens 4 | −0.803 | ASP | 0.255 | Plastic | 1.650 | 21.4 | −33.90 |
| 9 | | −0.938 | ASP | 0.092 | | | | |
| 10 | Lens 5 | 1.744 | ASP | 0.942 | Plastic | 1.583 | 30.2 | 41.35 |
| 11 | | 1.506 | ASP | 0.440 | | | | |
| 12 | IR-cut filter | Plano | | 0.330 | Glass | 1.517 | 64.2 | — |
| 13 | | Plano | | 0.892 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | −8.2203E+00 | −1.0000E+00 | −1.3677E+01 | −3.4984E+01 | −7.1581E+01 |
| A4 = | 7.2964E−02 | −9.8728E−02 | −3.1666E−01 | −2.5592E−01 | −1.2030E−01 |
| A6 = | −5.7324E−02 | −8.0605E−03 | 1.7276E−01 | 2.9863E−01 | −3.9288E−02 |
| A8 = | −1.9415E−02 | −8.8428E−02 | −1.5964E−01 | −3.6295E−01 | 6.2531E−02 |
| A10 = | −5.1075E−02 | 5.8246E−02 | 7.1569E−02 | 2.6282E−01 | −3.5903E−02 |
| A12 = | 1.4748E−01 | −2.3976E−04 | 3.9420E−02 | −1.2759E−01 | 3.6770E−03 |
| A14 = | −1.3376E−01 | −1.6482E−02 | −1.6850E−02 | 3.2732E−02 | |

| Surface # | 7 | 8 | 9 | 10 | 11 |
|---|---|---|---|---|---|
| k = | −5.6042E+01 | −5.8741E+00 | −5.2709E+00 | −1.8099E+00 | −7.2552E+00 |
| A4 = | 2.0346E−02 | −5.4997E−02 | −2.8223E−01 | −4.1125E−01 | −2.0067E+00 |
| A6 = | −1.2327E−01 | 3.7597E−01 | 5.1597E−01 | 4.0881E−01 | 3.4920E+00 |
| A8 = | 2.9331E−02 | −7.6198E−01 | −5.9950E−01 | −4.1856E−01 | −6.6966E+00 |
| A10 = | 2.4105E−02 | 6.9361E−01 | 4.1594E−01 | 3.0080E−01 | 9.1308E+00 |
| A12 = | −1.3567E−02 | −3.0052E−01 | −1.3625E−01 | −1.3482E−01 | −7.9912E+00 |
| A14 = | | 4.8882E−02 | 1.6666E−02 | 3.3435E−02 | 3.7552E+00 |
| A16 = | | | | −3.4218E−03 | −6.8314E−01 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
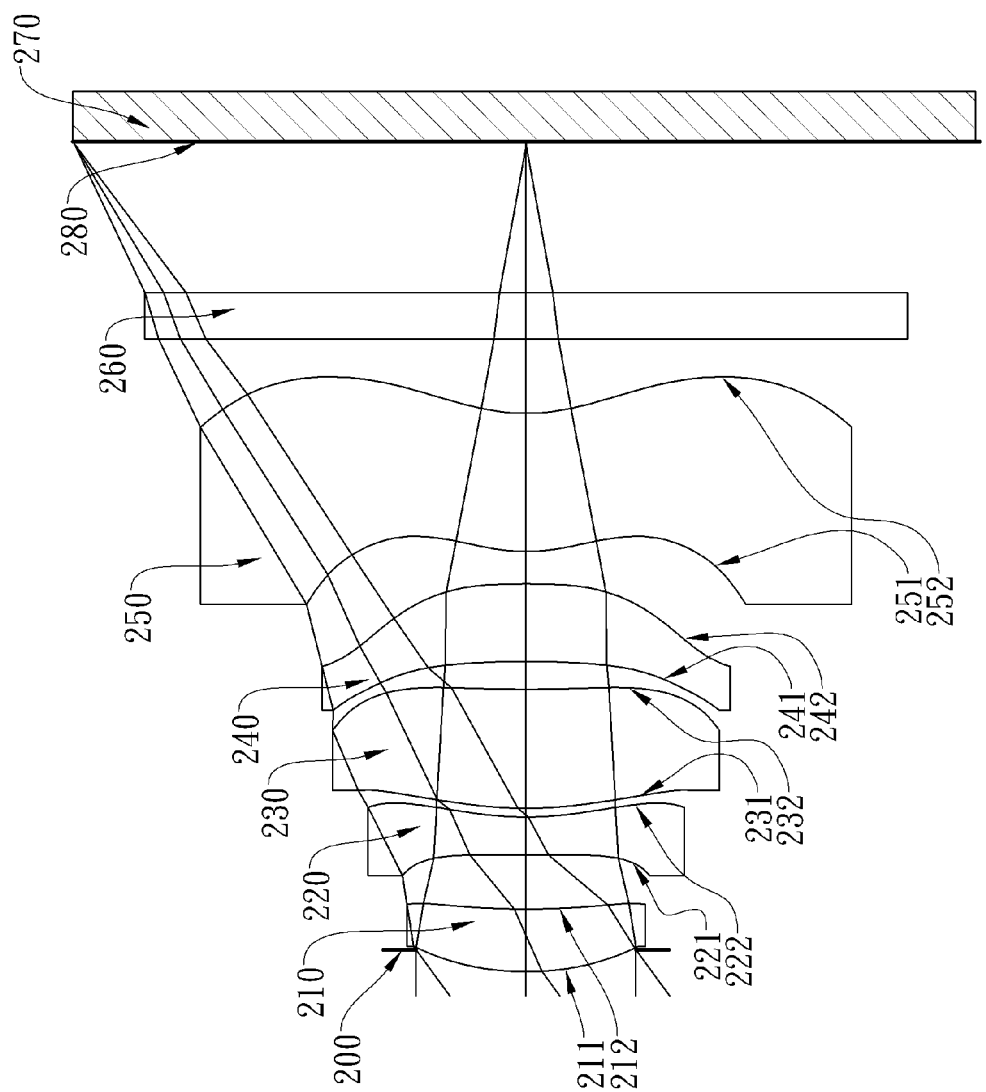
FIG. 2A is a schematic view of an image capturing lens system according to the 2nd embodiment of the present disclosure.
Figure 2B:
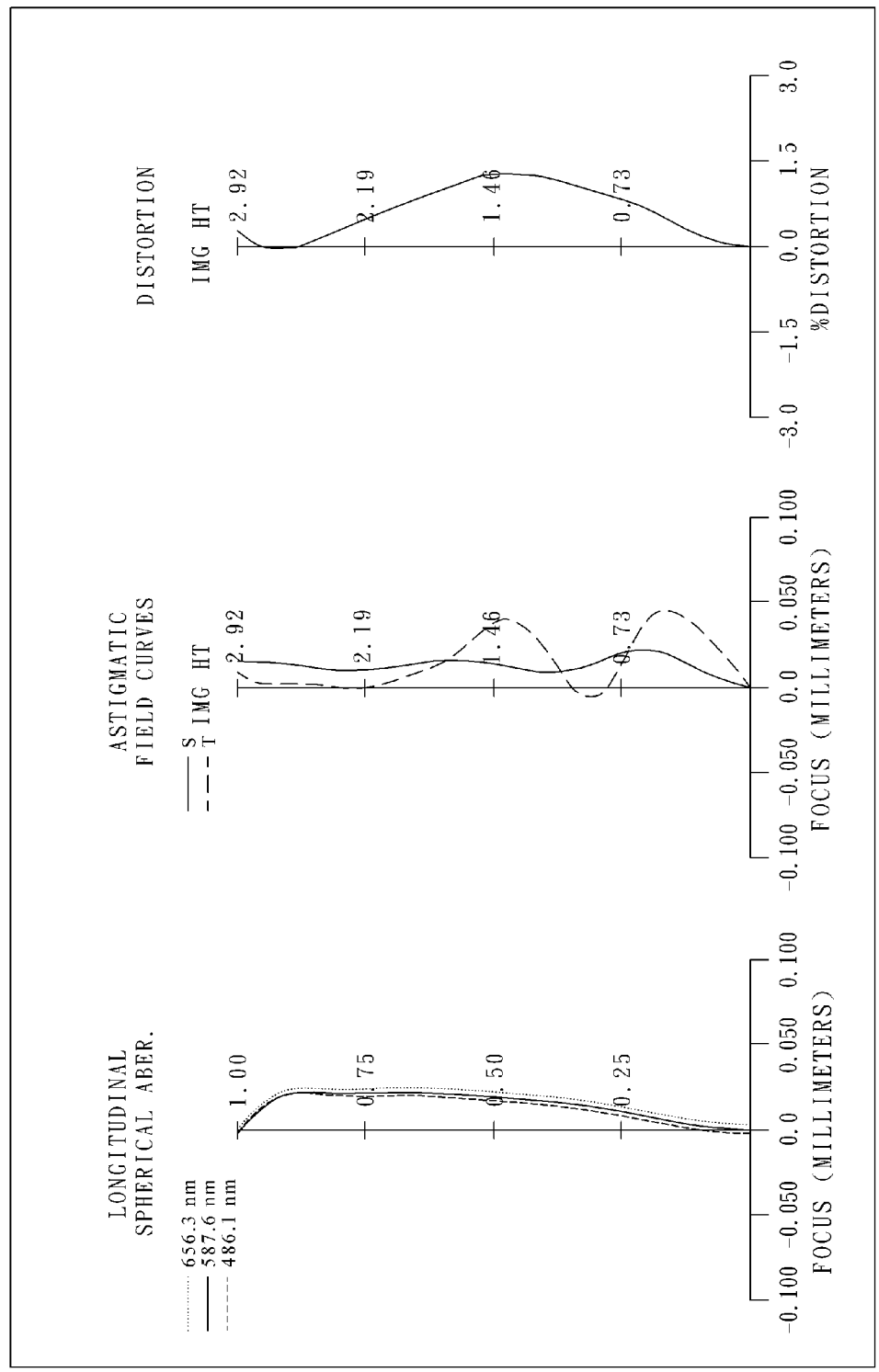
FIG. 2B shows spherical aberration curves, astigmatic field curves and a distortion curve of the image capturing lens system according to the 2nd embodiment.

FIG. 2A is a schematic view of an image capturing lens system according to the 2nd embodiment of the present disclosure. FIG. 2B shows spherical aberration curves, astigmatic field curves and a distortion curve of the image capturing lens system according to the 2nd embodiment. In FIG. 2A, the image capturing lens system includes five non-cemented lens elements with refractive power, in order from an object side to an image side, an aperture stop 200, the first lens element 210, the second lens element 220, the third lens element 230, the fourth lens element 240, the fifth lens element 250, an IR-cut filter 260, an image plane 280 and an image sensor 270.

The first lens element 210 with positive refractive power has a convex object-side surface 211 in a paraxial region thereof and a concave image-side surface 212 in a paraxial region thereof, and is made of plastic material. The object-side surface 211 and the image-side surface 212 of the first lens element 210 are aspheric.

The second lens element 220 with negative refractive power has a convex object-side surface 221 in a paraxial region thereof and a concave image-side surface 222 in a paraxial region thereof, and is made of plastic material. The object-side surface 221 and the image-side surface 222 of the second lens element 220 are aspheric, wherein the image-side surface 222 of the second lens element 220 has at least one convex shape in an off-axis region thereof.

The third lens element 230 with positive refractive power has a convex object-side surface 231 in a paraxial region thereof and a concave image-side surface 232 in a paraxial region thereof, and is made of plastic material. The object-side surface 231 and the image-side surface 232 of the third lens element 230 are aspheric, wherein the object-side surface 231 of the third lens element 230 has at least one concave shape in an off-axis region thereof.

The fourth lens element 240 with negative refractive power has a concave object-side surface 241 in a paraxial region thereof and a convex image-side surface 242 in a paraxial region thereof, and is made of plastic material. The object-side surface 241 and the image-side surface 242 of the fourth lens element 240 are aspheric.

The fifth lens element 250 with positive refractive power has a convex object-side surface 251 in a paraxial region thereof and a concave image-side surface 252 in a paraxial region thereof, and is made of plastic material. The object-side surface 251 and the image-side surface 252 of the fifth lens element 250 are aspheric. Furthermore, the fifth lens element 250 has at least one inflection point formed on the image-side surface 252 thereof.

The IR-cut filter 260 is made of glass and located between the fifth lens element 250 and the image plane 280, and will not affect the focal length of the image capturing lens system. Moreover, the image capturing lens system further includes an image sensor 270 located on the image plane 280.

The detailed optical data of the 2nd embodiment are shown in Table 3 and the aspheric surface data are shown in Table 4 below.

In the image capturing lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 3.97 | Sag21/CT2 | −0.55 |
| Fno | 2.80 | (R3 + R4)/(R3 − R4) | 1.20 |
| HFOV [deg.] | 36.2 | f1 [mm] | 4.77 |
| T12/CT2 | 1.42 | |f2| [mm] | 3.57 |
| (T23 + T34)/CT3 | 0.31 | f3 [mm] | 5.72 |
| CT3/CT4 | 1.54 | f/f4 | −0.14 |
| CT5/ΣCT | 0.32 | f1/f2 | −1.34 |
| ΣCT/Td | 0.78 | f3/f1 | 1.20 |
| SL/TTL | 0.97 | | |

TABLE 3

2nd Embodiment
f = 3.97 mm, Fno = 2.80, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.142 | | | | |
| 2 | Lens 1 | 1.742 | ASP | 0.404 | Plastic | 1.544 | 55.9 | 4.77 |
| 3 | | 4.870 | ASP | 0.349 | | | | |
| 4 | Lens 2 | 21.989 | ASP | 0.245 | Plastic | 1.607 | 26.6 | −3.57 |
| 5 | | 1.963 | ASP | 0.056 | | | | |
| 6 | Lens 3 | 2.326 | ASP | 0.768 | Plastic | 1.544 | 55.9 | 5.72 |
| 7 | | 8.122 | ASP | 0.180 | | | | |
| 8 | Lens 4 | −5.912 | ASP | 0.500 | Plastic | 1.535 | 55.7 | −29.21 |
| 9 | | −9.791 | ASP | 0.209 | | | | |
| 10 | Lens 5 | 1.056 | ASP | 0.892 | Plastic | 1.535 | 55.7 | 5.11 |
| 11 | | 1.214 | ASP | 0.480 | | | | |
| 12 | IR-cut filter | Plano | | 0.300 | Glass | 1.517 | 64.2 | — |
| 13 | | Plano | | 0.975 | | | | |
| 14 | Image | Plano | | — | | | | |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | −2.9285E+00 | 9.4170E+00 | 7.4150E+00 | −2.8710E+00 | −1.6787E+01 |
| A4 = | 9.7624E−02 | −6.5487E−03 | −1.8810E−01 | −2.2838E−01 | −4.0187E−02 |
| A6 = | −2.6670E−02 | −2.0057E−01 | −1.1318E−01 | 2.1468E−01 | 1.8917E−02 |
| A8 = | 4.2293E−02 | 9.7350E−01 | 2.0558E−02 | −1.7004E−01 | 3.9339E−02 |
| A10 = | 2.1328E−01 | −3.1731E+00 | 1.9635E−02 | 7.1274E−02 | −4.5517E−02 |
| A12 = | −9.0830E−01 | 4.1366E+00 | −6.4755E−01 | −1.0758E−01 | 1.1989E−03 |
| A14 = | 7.5654E−01 | −2.2531E+00 | −1.2080E−01 | 5.9495E−02 | |

| Surface # | 7 | 8 | 9 | 10 | 11 |
|---|---|---|---|---|---|
| k = | −6.8559E+01 | −4.7677E+01 | 9.4722E+00 | −4.0262E+00 | −2.6545E+00 |
| A4 = | −4.3518E−02 | −2.6970E−02 | −8.0154E−01 | −2.5297E+00 | −4.1104E+00 |
| A6 = | −8.6716E−02 | −1.0530E−02 | 1.4226E+00 | 7.2917E+00 | 7.8857E+00 |
| A8 = | 2.1914E−02 | −4.2890E−01 | −1.9371E+00 | −2.2604E+01 | −9.9670E+00 |
| A10 = | 9.7216E−03 | 6.5306E−01 | 1.5286E+00 | 4.5249E+01 | 8.1716E+00 |
| A12 = | −8.8139E−03 | −3.5075E−01 | −5.8843E−01 | −5.0556E+01 | −5.3751E+00 |
| A14 = | | 6.4247E−02 | 8.6956E−02 | 2.8239E+01 | 2.6728E+00 |
| A16 = | | | | −6.0629E+00 | −5.8073E−01 |

3rd Embodiment

Figure 3A:
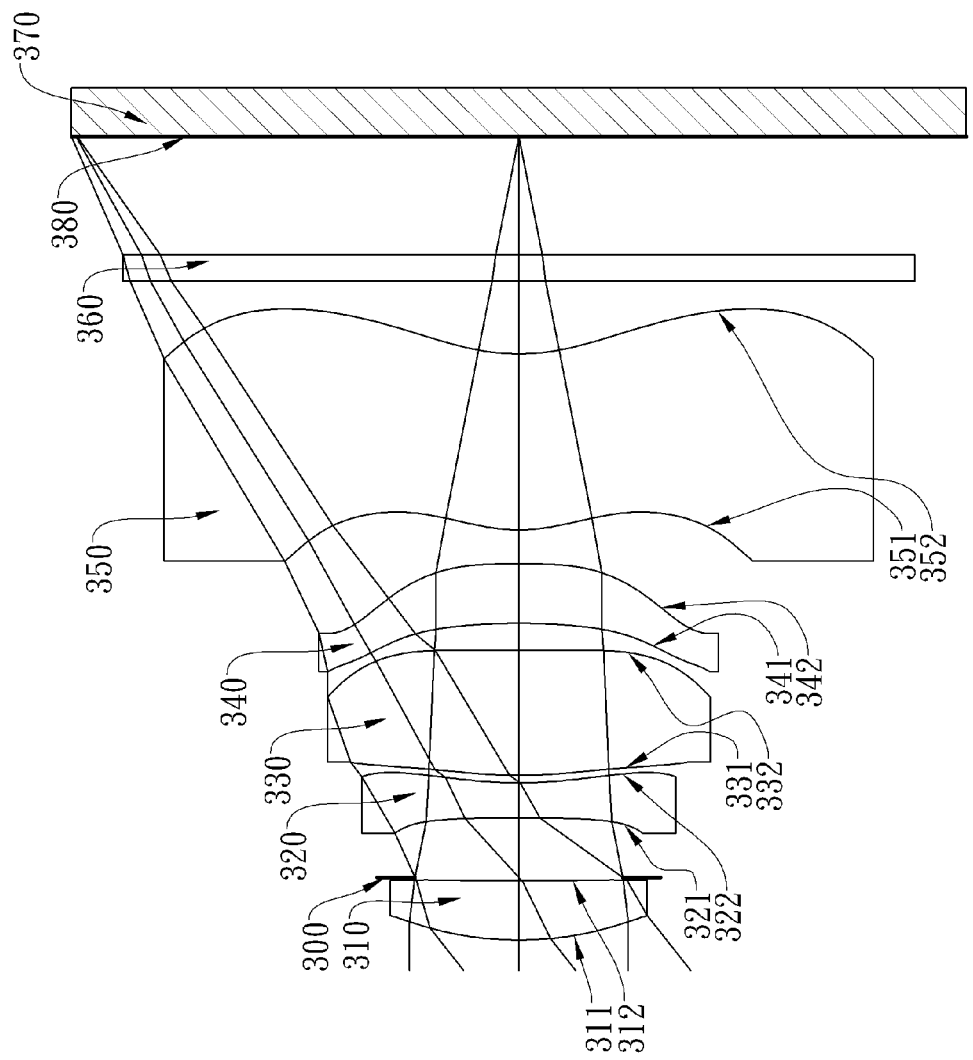
FIG. 3A is a schematic view of an image capturing lens system according to the 3rd embodiment of the present disclosure.
Figure 3B:
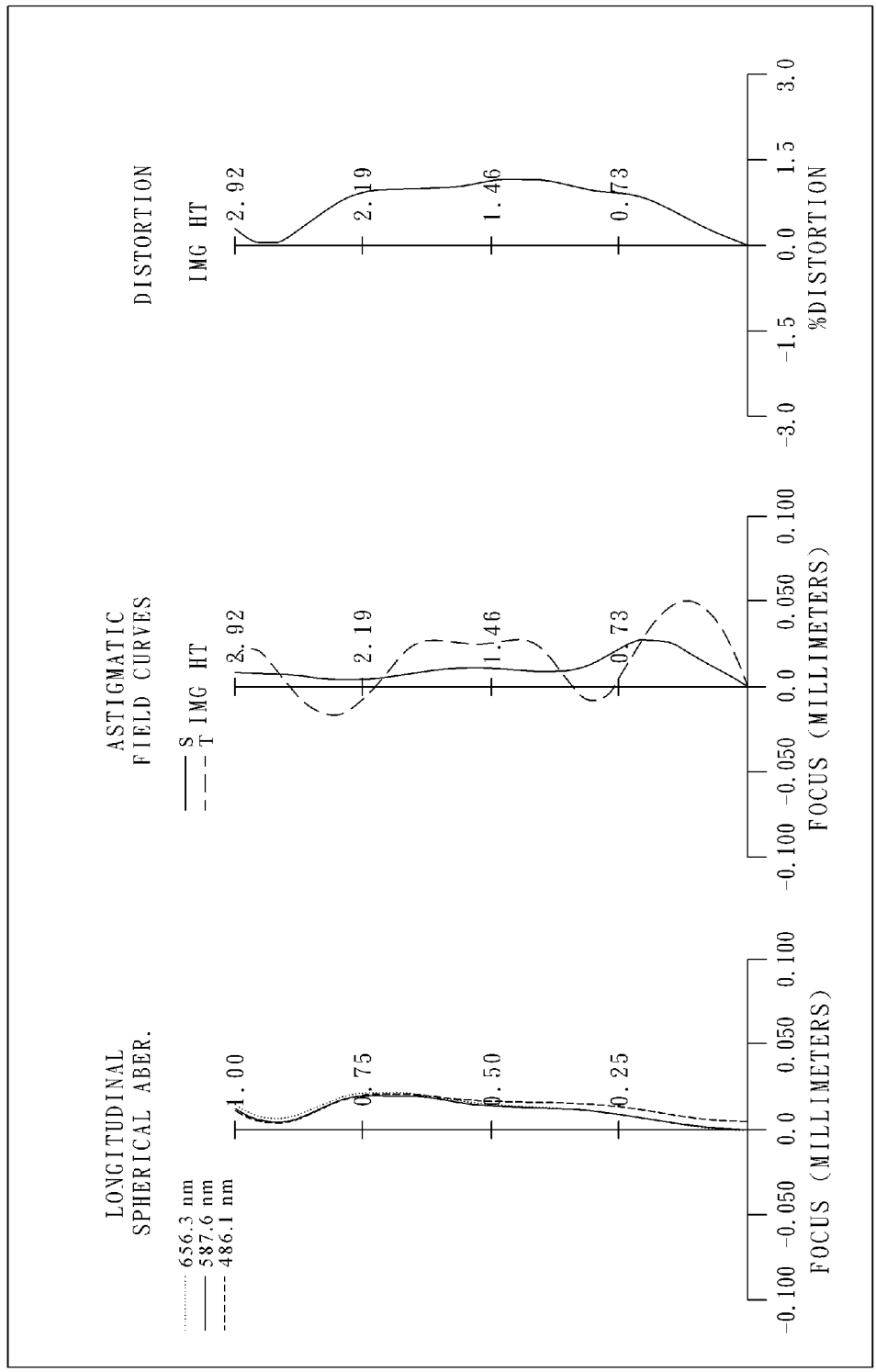
FIG. 3B shows spherical aberration curves, astigmatic field curves and a distortion curve of the image capturing lens system according to the 3rd embodiment.

FIG. 3A is a schematic view of an image capturing lens system according to the 3rd embodiment of the present disclosure. FIG. 3B shows spherical aberration curves, astigmatic field curves and a distortion curve of the image capturing lens system according to the 3rd embodiment. In FIG. 3A, the image capturing lens system includes five non-cemented lens elements with refractive power, in order from an object side to an image side, the first lens element 310, an aperture stop 300, the second lens element 320, the third lens element 330, the fourth lens element 340, the fifth lens element 350, an IR-cut filter 360, an image plane 380 and an image sensor 370.

The first lens element 310 with positive refractive power has a convex object-side surface 311 in a paraxial region thereof and a concave image-side surface 312 in a paraxial region thereof, and is made of plastic material. The object-side surface 311 and the image-side surface 312 of the first lens element 310 are aspheric.

The second lens element 320 with negative refractive power has a concave object-side surface 321 in a paraxial region thereof and a concave image-side surface 322 in a paraxial region thereof, and is made of plastic material. The object-side surface 321 and the image-side surface 322 of the second lens element 320 are aspheric, wherein the image-side surface 322 of the second lens element 320 has at least one convex shape in an off-axis region thereof.

The third lens element 330 with positive refractive power has a convex object-side surface 331 in a paraxial region thereof and a concave image-side surface 332 in a paraxial region thereof, and is made of plastic material. The object-side surface 331 and the image-side surface 332 of the third lens element 330 are aspheric, wherein the object-side surface 331 of the third lens element 330 has at least one concave shape in an off-axis region thereof.

The fourth lens element 340 with negative refractive power has a concave object-side surface 341 in a paraxial region thereof and a convex image-side surface 342 in a paraxial region thereof, and is made of plastic material. The object-side surface 341 and the image-side surface 342 of the fourth lens element 340 are aspheric.

The fifth lens element 350 with positive refractive power has a convex object-side surface 351 in a paraxial region thereof and a concave image-side surface 352 in a paraxial region thereof, and is made of plastic material. The object-side surface 351 and the image-side surface 352 of the fifth lens element 350 are aspheric. Furthermore, the fifth lens element 350 has at least one inflection point formed on the image-side surface 352 thereof.

The IR-cut filter 360 is made of glass and located between the fifth lens element 350 and the image plane 380, and will not affect the focal length of the image capturing lens system. Moreover, the image capturing lens system further includes an image sensor 370 located on the image plane 380.

The detailed optical data of the 3rd embodiment are shown in Table 5 and the aspheric surface data are shown in Table 6 below.

TABLE 5

3rd Embodiment
f = 3.68 mm, Fno = 2.55, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.218 | ASP | 0.389 | Plastic | 1.544 | 55.9 | 4.57 |
| 2 | | 19.346 | ASP | 0.025 | | | | |
| 3 | Ape. Stop | Plano | | 0.391 | | | | |
| 4 | Lens 2 | −24.649 | ASP | 0.232 | Plastic | 1.634 | 23.8 | −3.58 |
| 5 | | 2.512 | ASP | 0.050 | | | | |
| 6 | Lens 3 | 2.764 | ASP | 0.824 | Plastic | 1.544 | 55.9 | 5.76 |
| 7 | | 20.823 | ASP | 0.180 | | | | |
| 8 | Lens 4 | −4.234 | ASP | 0.393 | Plastic | 1.544 | 55.9 | −11.66 |
| 9 | | −13.137 | ASP | 0.224 | | | | |
| 10 | Lens 5 | 1.049 | ASP | 1.162 | Plastic | 1.535 | 55.7 | 3.81 |
| 11 | | 1.329 | ASP | 0.480 | | | | |
| 12 | IR-cut filter | Plano | | 0.175 | Glass | 1.517 | 64.2 | — |
| 13 | | Plano | | 0.779 | | | | |
| 14 | Image | Plano | | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k = | −4.2953E+00 | 2.4954E+00 | −9.0000E+01 | −1.2126E+00 | −2.7247E+01 |
| A4 = | 6.5762E−02 | 4.9205E−03 | −8.1837E−02 | −2.1639E−01 | −9.3054E−02 |
| A6 = | −5.1802E−02 | −1.5150E−01 | −8.5770E−02 | 2.1034E−01 | 1.9431E−02 |
| A8 = | 8.7822E−02 | 8.8923E−01 | 2.0677E−02 | −1.7352E−01 | 6.1451E−02 |
| A10 = | −7.9762E−02 | −2.9426E+00 | 3.5765E−02 | 8.5590E−02 | −3.7834E−02 |

TABLE 6-continued

| Aspheric Coefficients | | | | | |
|---|---|---|---|---|---|
| A12 = | −5.0562E−02 | 4.1084E+00 | −2.3577E−01 | −9.8009E−02 | 6.2440E−03 |
| A14 = | −2.1876E−03 | −2.2531E+00 | −2.4175E−01 | 4.7052E−02 | |

| Surface # | 7 | 8 | 9 | 10 | 11 |
|---|---|---|---|---|---|
| k = | −1.7040E+01 | −1.2855E+01 | 8.9831E+01 | −6.1480E+00 | −9.2566E−01 |
| A4 = | −5.2176E−02 | −2.2062E−02 | −8.0760E−01 | −2.9085E−01 | −7.3537E+00 |
| A6 = | −9.2035E−02 | −8.2492E−02 | 1.3921E+00 | 2.3649E−01 | 1.4453E+01 |
| A8 = | 2.0744E−02 | −3.2276E−01 | −1.9343E+00 | −3.1341E−01 | −1.9725E+01 |
| A10 = | 6.0304E−03 | 5.5614E−01 | 1.5876E+00 | 3.2862E−01 | 1.6419E+01 |
| A12 = | −2.1922E−03 | −2.7088E−01 | −6.2609E−01 | −1.9012E−01 | −9.2998E+00 |
| A14 = | | 3.9323E−02 | 9.4042E−02 | 5.3821E−02 | 3.7452E+00 |
| A16 = | | | | −5.8454E−03 | −7.6858E−01 |

In the image capturing lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 3.68 | Sag21/CT2 | −0.43 |
| Fno | 2.55 | (R3 + R4)/(R3 − R4) | 0.82 |
| HFOV [deg.] | 38.3 | f1 [mm] | 4.57 |
| T12/CT2 | 1.79 | \|f2\| [mm] | 3.58 |
| (T23 + T34)/CT3 | 0.28 | f3 [mm] | 5.76 |
| CT3/CT4 | 2.10 | f/f4 | −0.32 |
| CT5/ΣCT | 0.39 | f1/f2 | −1.28 |
| ΣCT/Td | 0.78 | f3/f1 | 1.26 |
| SL/TTL | 0.92 | | |

4th Embodiment

Figure 4A:
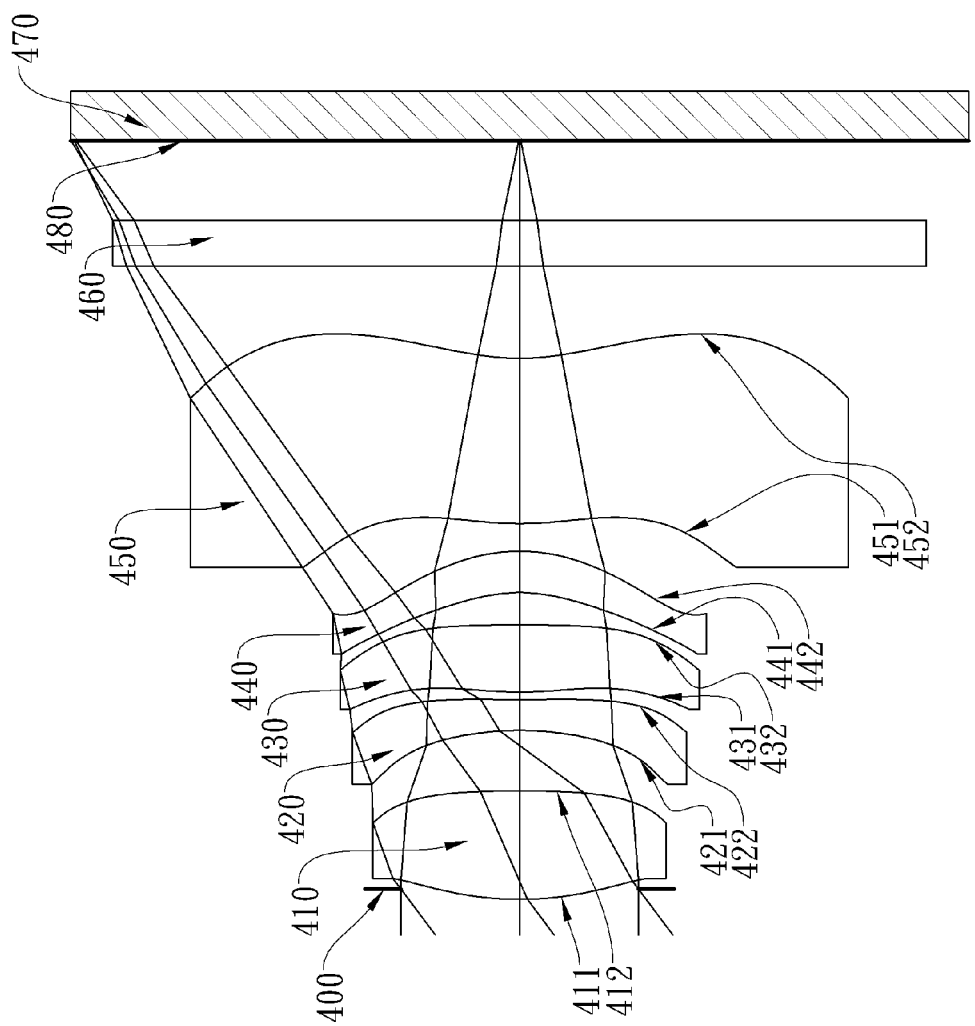
FIG. 4A is a schematic view of an image capturing lens system according to the 4th embodiment of the present disclosure.
Figure 4B:
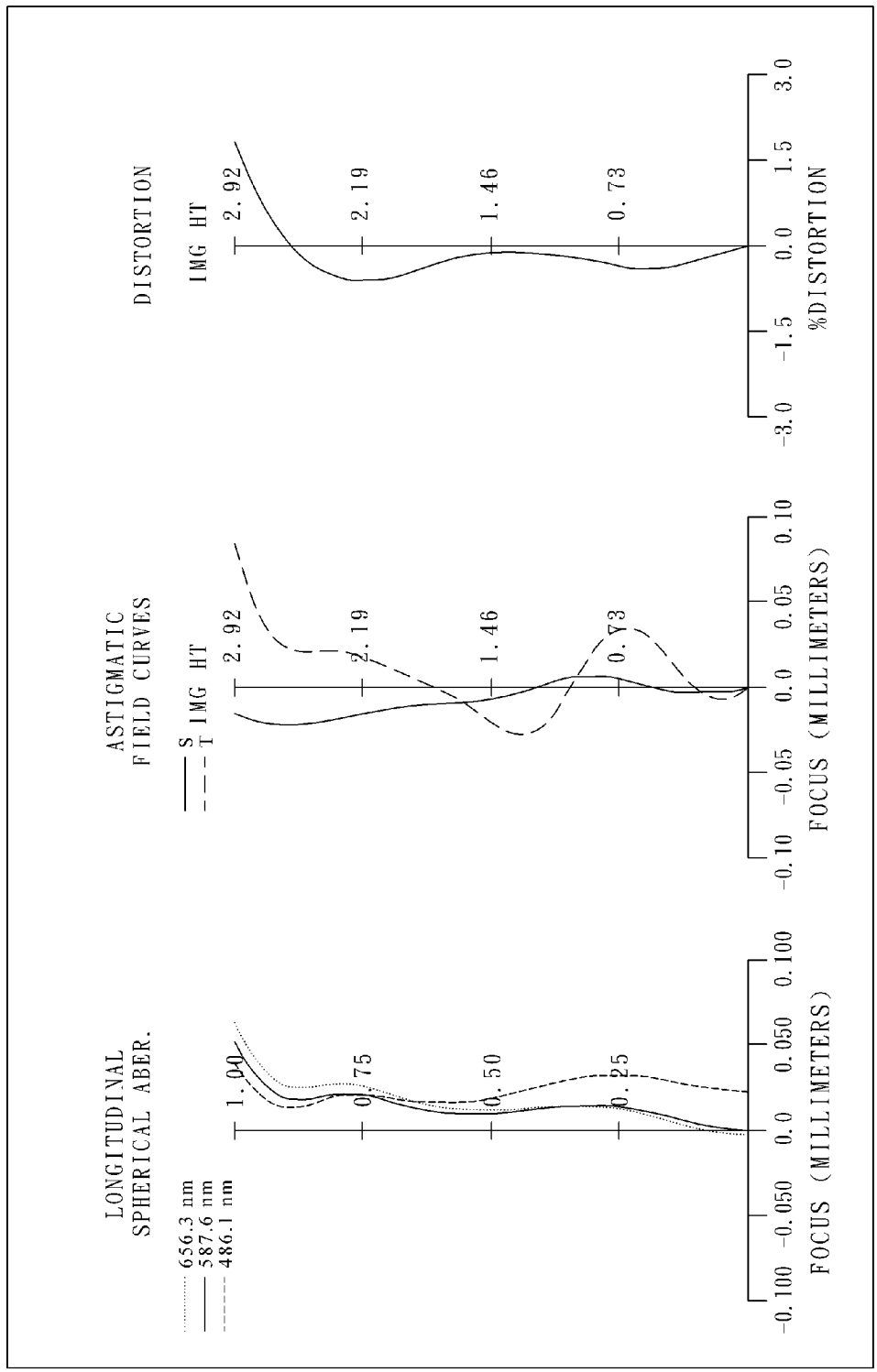
FIG. 4B shows spherical aberration curves, astigmatic field curves and a distortion curve of the image capturing lens system according to the 4th embodiment.

FIG. 4A is a schematic view of an image capturing lens system according to the 4th embodiment of the present disclosure. FIG. 4B shows spherical aberration curves, astigmatic field curves and a distortion curve of the image capturing lens system according to the 4th embodiment. In FIG. 4A, the image capturing lens system includes five non-cemented lens elements with refractive power, in order from an object side to an image side, an aperture stop 400, the first lens element 410, the second lens element 420, the third lens element 430, the fourth lens element 440, the fifth lens element 450, an IR-cut filter 460, an image plane 480 and an image sensor 470.

The first lens element 410 with positive refractive power has a convex object-side surface 411 in a paraxial region thereof and a convex image-side surface 412 in a paraxial region thereof, and is made of plastic material. The object-side surface 411 and the image-side surface 412 of the first lens element 410 are aspheric.

The second lens element 420 with negative refractive power has a concave object-side surface 421 in a paraxial region thereof and a concave image-side surface 422 in a paraxial region thereof, and is made of plastic material. The object-side surface 421 and the image-side surface 422 of the second lens element 420 are aspheric, wherein the image-side surface 422 of the second lens element 420 has at least one convex shape in an off-axis region thereof.

The third lens element 430 with positive refractive power has a convex object-side surface 431 in a paraxial region thereof and a convex image-side surface 432 in a paraxial region thereof, and is made of plastic material. The object-side surface 431 and the image-side surface 432 of the third lens element 430 are aspheric, wherein the object-side surface 431 of the third lens element 430 has at least one concave shape in an off-axis region thereof.

The fourth lens element 440 with negative refractive power has a concave object-side surface 441 in a paraxial region thereof and a convex image-side surface 442 in a paraxial region thereof, and is made of plastic material. The object-side surface 441 and the image-side surface 442 of the fourth lens element 440 are aspheric.

The fifth lens element 450 with negative refractive power has a convex object-side surface 451 in a paraxial region thereof and a concave image-side surface 452 in a paraxial region thereof, and is made of plastic material. The object-side surface 451 and the image-side surface 452 of the fifth lens element 450 are aspheric. Furthermore, the fifth lens element 450 has at least one inflection point formed on the image-side surface 452 thereof.

The IR-cut filter 460 is made of glass and located between the fifth lens element 450 and the image plane 480, and will not affect the focal length of the image capturing lens system. Moreover, the image capturing lens system further includes an image sensor 470 located on the image plane 480.

The detailed optical data of the 4th embodiment are shown in Table 7 and the aspheric surface data are shown in Table 8 below.

TABLE 7

4th Embodiment
f = 3.79 mm, Fno = 2.45, HFOV = 37.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.067 | | | | |

TABLE 7-continued

4th Embodiment
f = 3.79 mm, Fno = 2.45, HFOV = 37.0 deg.

| Surface # | | Curvature Radius | | Thickness | Material | Index | Abbe # | Focal Length |
|---|---|---|---|---|---|---|---|---|
| 2 | Lens 1 | 2.075 | ASP | 0.707 | Plastic | 1.544 | 55.9 | 3.09 |
| 3 | | −7.839 | ASP | 0.394 | | | | |
| 4 | Lens 2 | −1.956 | ASP | 0.200 | Plastic | 1.650 | 21.4 | −2.57 |
| 5 | | 12.012 | ASP | 0.050 | | | | |
| 6 | Lens 3 | 2.075 | ASP | 0.438 | Plastic | 1.544 | 55.9 | 3.34 |
| 7 | | −13.407 | ASP | 0.211 | | | | |
| 8 | Lens 4 | −0.981 | ASP | 0.269 | Plastic | 1.634 | 23.8 | −32.69 |
| 9 | | −1.139 | ASP | 0.180 | | | | |
| 10 | Lens 5 | 1.972 | ASP | 1.078 | Plastic | 1.583 | 30.2 | −176.25 |
| 11 | | 1.545 | ASP | 0.600 | | | | |
| 12 | IR-cut filter | Plano | | 0.300 | Glass | 1.517 | 64.2 | — |
| 13 | | Plano | | 0.518 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −1.1531E+01 | −1.0000E+00 | −3.5278E+01 | 1.1955E+01 | −5.5521E+01 |
| A4 = | 1.1997E−01 | −9.2866E−02 | −3.1671E−01 | −2.9521E−01 | −2.2796E−01 |
| A6 = | −1.1991E−01 | −2.7079E−02 | 2.4186E−01 | 4.6772E−01 | −1.6794E−02 |
| A8 = | −1.5835E−02 | −1.3066E−01 | −3.2812E−01 | −7.0125E−01 | 1.5276E−01 |
| A10 = | −9.0852E−02 | 1.4671E−01 | 2.0631E−01 | 5.8990E−01 | −9.7606E−02 |
| A12 = | 3.9857E−01 | −1.1075E−01 | −3.5572E−01 | −3.6491E−01 | 2.0110E−02 |
| A14 = | −4.2794E−01 | 1.3357E−02 | 2.9047E−01 | 1.1792E−01 | |

| Surface # | 7 | 8 | 9 | 10 | 11 |
|---|---|---|---|---|---|
| k = | 1.9228E+01 | −8.3207E+00 | −6.0149E+00 | −1.6366E+00 | −1.0285E+01 |
| A4 = | −4.7247E−02 | −1.6425E−01 | −4.1390E−01 | −5.7397E−01 | −6.5006E−02 |
| A6 = | −1.5997E−01 | 6.1730E−01 | 8.2141E−01 | 8.0577E−01 | 2.0160E−02 |
| A8 = | 4.9431E−02 | −1.4444E+00 | −1.1623E+00 | −1.0346E+00 | −1.0190E−02 |
| A10 = | 5.2200E−02 | 1.6456E+00 | 9.8336E−01 | 8.5533E−01 | 3.6468E−03 |
| A12 = | −2.5715E−02 | −8.8494E−01 | −3.8810E−01 | −4.2323E−01 | −7.6338E−04 |
| A14 = | | 1.7961E−01 | 5.6163E−02 | 1.1456E−01 | 8.0814E−05 |
| A16 = | | | | −1.2902E−02 | −3.2218E−06 |

In the image capturing lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 3.79 | Sag21/CT2 | −1.77 |
| Fno | 2.45 | (R3 + R4)/(R3 − R4) | −0.72 |
| HFOV [deg.] | 37.0 | f1 [mm] | 3.09 |
| T12/CT2 | 1.97 | |f2| [mm] | 2.57 |
| (T23 + T34)/CT3 | 0.60 | f3 [mm] | 3.34 |
| CT3/CT4 | 1.63 | f/f4 | −0.12 |
| CT5/ΣCT | 0.40 | f1/f2 | −1.20 |
| ΣCT/Td | 0.76 | f3/f1 | 1.08 |
| SL/TTL | 0.99 | | |

5th Embodiment

Figure 5A:
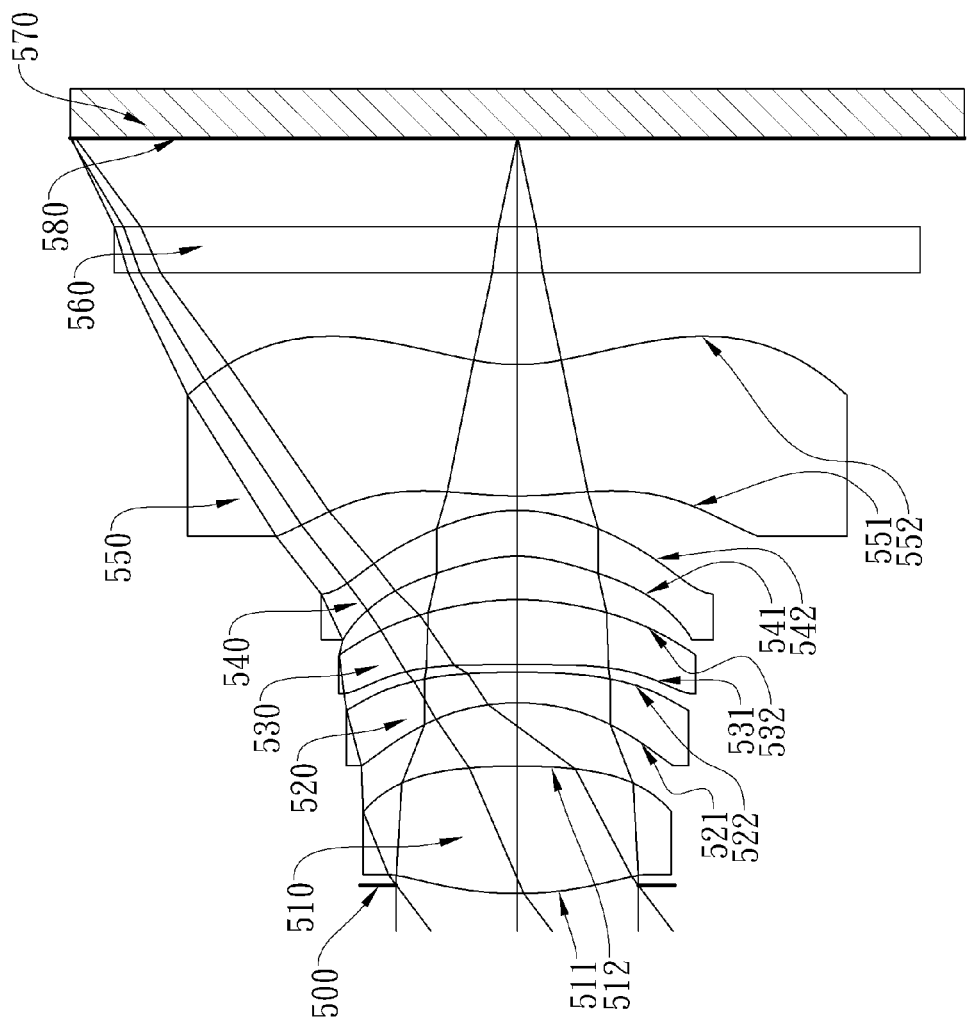
FIG. 5A is a schematic view of an image capturing lens system according to the 5th embodiment of the present disclosure.
Figure 5B:
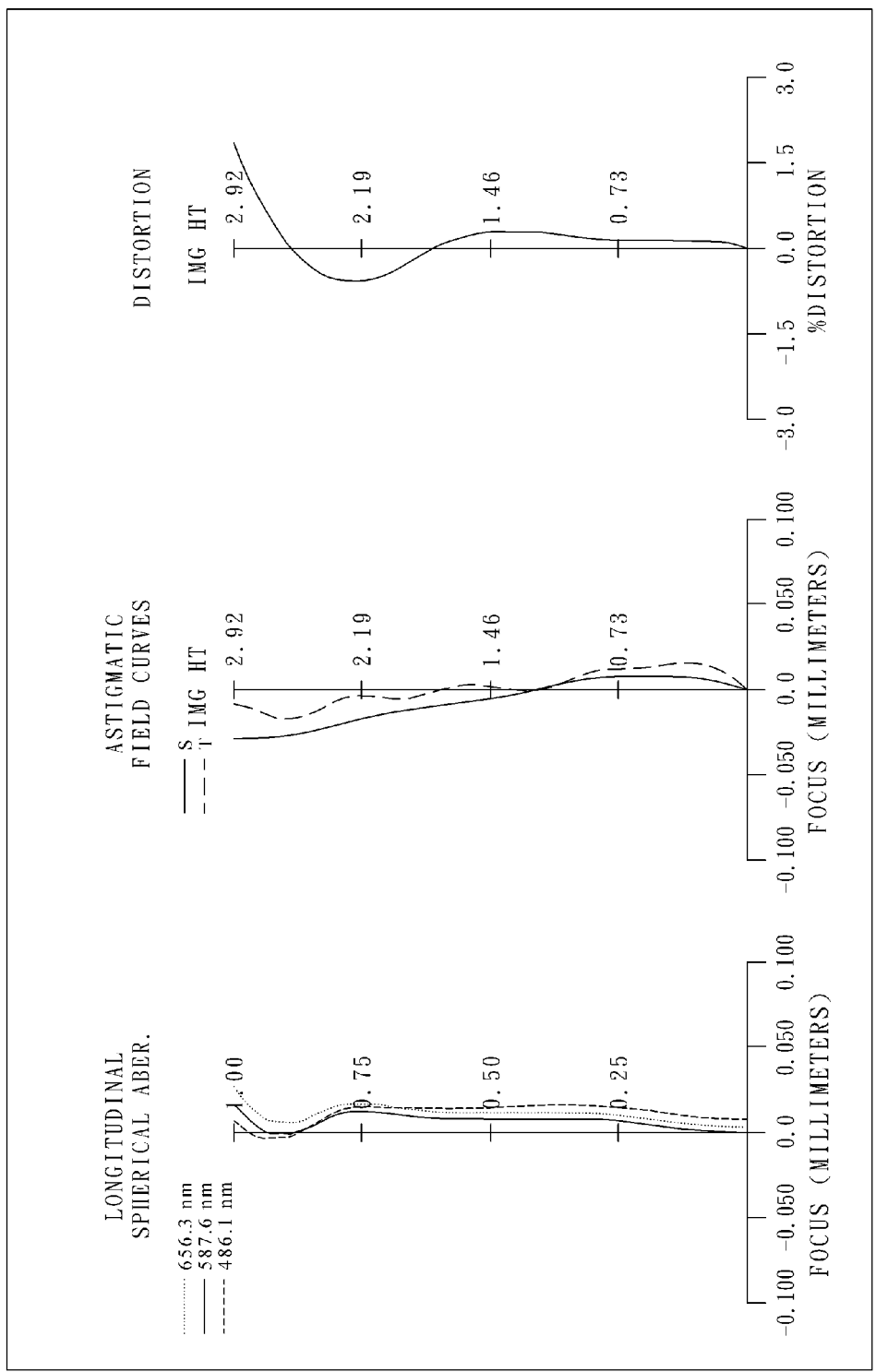
FIG. 5B shows spherical aberration curves, astigmatic field curves and a distortion curve of the image capturing lens system according to the 5th embodiment.

FIG. 5A is a schematic view of an image capturing lens system according to the 5th embodiment of the present disclosure. FIG. 5B shows spherical aberration curves, astigmatic field curves and a distortion curve of the image capturing lens system according to the 5th embodiment. In FIG. 5A, the image capturing lens system includes five non-cemented lens elements with refractive power, in order from an object side to an image side, an aperture stop 500, the first lens element 510, the second lens element 520, the third lens element 530, the fourth lens element 540, the fifth lens element 550, an IR-cut filter 560, an image plane 580 and an image sensor 570.

The first lens element 510 with positive refractive power has a convex object-side surface 511 in a paraxial region thereof and a convex image-side surface 512, and is made of plastic. The object-side surface 511 and the image-side surface 512 of the first lens element 510 are aspheric.

The second lens element 520 with negative refractive power has a concave object-side surface 521 in a paraxial region thereof and a convex image-side surface 522 in a paraxial region thereof, and is made of plastic material. The object-side surface 521 and the image-side surface 522 of the second lens element 520 are aspheric.

The third lens element 530 with positive refractive power has a concave object-side surface 531 in a paraxial region thereof and a convex image-side surface 532 in a paraxial region thereof, and is made of plastic material. The object-side surface 531 and the image-side surface 532 of the third lens element 530 are aspheric.

The fourth lens element 540 with negative refractive power has a concave object-side surface 541 in a paraxial region thereof and a convex image-side surface 542 in a paraxial region thereof, and is made of plastic material. The object-side surface 541 and the image-side surface 542 of the fourth lens element 540 are aspheric.

The fifth lens element 550 with negative refractive power has a convex object-side surface 551 in a paraxial region thereof and a concave image-side surface 552 in a paraxial region thereof, and is made of plastic material. The object-side surface 551 and the image-side surface 552 of the fifth lens element 550 are aspheric. Furthermore, the fifth lens element 550 has at least one inflection point formed on the image-side surface 552 thereof.

The IR-cut filter 560 is made of glass and located between the fifth lens element 550 and the image plane 580, and will not affect the focal length of the image capturing lens system. Moreover, the image capturing lens system further includes an image sensor 570 located on the image plane 580.

The detailed optical data of the 5th embodiment are shown in Table 9 and the aspheric surface data are shown in Table 10 below.

TABLE 9

5th Embodiment
f = 3.79 mm, Fno = 2.40, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.055 | | | | |
| 2 | Lens 1 | 2.172 | ASP | 0.834 | Plastic | 1.544 | 55.9 | 2.84 |
| 3 | | −4.612 | ASP | 0.413 | | | | |
| 4 | Lens 2 | −1.513 | ASP | 0.200 | Plastic | 1.650 | 21.4 | −2.75 |
| 5 | | −10.296 | ASP | 0.050 | | | | |
| 6 | Lens 3 | −75.996 | ASP | 0.426 | Plastic | 1.566 | 42.0 | 2.92 |
| 7 | | −1.622 | ASP | 0.284 | | | | |
| 8 | Lens 4 | −0.844 | ASP | 0.300 | Plastic | 1.650 | 21.4 | −75.88 |
| 9 | | −0.979 | ASP | 0.093 | | | | |
| 10 | Lens 5 | 2.270 | ASP | 0.860 | Plastic | 1.583 | 30.2 | −7.30 |
| 11 | | 1.274 | ASP | 0.600 | | | | |
| 12 | IR-cut filter | Plano | | 0.300 | Glass | 1.517 | 64.2 | — |
| 13 | | Plano | | 0.581 | | | | |
| 14 | Image | Plano | | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | −1.2014E+01 | −1.0000E+00 | −1.2072E+00 | −1.4030E+01 | −9.0000E+01 |
| A4 = | 9.9663E−02 | −1.3600E−01 | −2.4105E−01 | −3.0646E−01 | −1.3061E−01 |
| A6 = | −1.1112E−01 | 2.0713E−02 | 3.4085E−01 | 5.0168E−01 | −7.1908E−02 |
| A8 = | −2.3663E−02 | −1.4313E−01 | −3.2301E−01 | −6.7668E−01 | 1.0296E−01 |
| A10 = | −7.5696E−02 | 1.2780E−01 | 1.9706E−01 | 6.0767E−01 | −7.7461E−02 |
| A12 = | 2.9995E−01 | −3.1915E−01 | −7.6154E−02 | −3.6735E−01 | 3.9793E−02 |
| A14 = | −3.1024E−01 | −2.0638E−02 | 2.7852E−02 | 1.0645E−01 | |

| Surface # | 7 | 8 | 9 | 10 | 11 |
|---|---|---|---|---|---|
| k = | −1.7793E+01 | −8.6017E+00 | −7.8442E+00 | −4.1989E−01 | −9.3362E+00 |
| A4 = | −4.8800E−02 | 2.1605E−02 | −3.2393E−01 | −3.2163E+00 | −7.4816E−02 |
| A6 = | −1.1416E−01 | −2.0488E−01 | 5.4560E−01 | 1.0232E+01 | 3.1563E−02 |
| A8 = | 5.3393E−02 | 2.5333E−01 | −6.0414E−01 | −2.6636E+01 | −1.6257E−02 |
| A10 = | 4.2839E−02 | −4.4079E−01 | 2.7569E−01 | 4.3584E+01 | 5.3763E−03 |
| A12 = | −2.6114E−02 | 3.9847E−01 | −7.0371E−03 | −4.1704E+01 | −1.0256E−03 |
| A14 = | | −1.3165E−01 | −1.5073E−02 | 2.1571E+01 | 1.0139E−04 |
| A16 = | | | | −4.6706E+00 | −3.9068E−06 |

In the image capturing lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 3.79 | Sag21/CT2 | −2.05 |
| Fno | 2.40 | (R3 + R4)/(R3 − R4) | −1.34 |
| HFOV [deg.] | 37.0 | f1 [mm] | 2.84 |
| T12/CT2 | 2.07 | \|f2\| [mm] | 2.75 |
| (T23 + T34)/CT3 | 0.78 | f3 [mm] | 2.92 |
| CT3/CT4 | 1.42 | f/f4 | −0.05 |
| CT5/ΣCT | 0.33 | f1/f2 | −1.03 |
| ΣCT/Td | 0.76 | f3/f1 | 1.03 |
| SL/TTL | 0.99 | | |

6th Embodiment

Figure 6A:
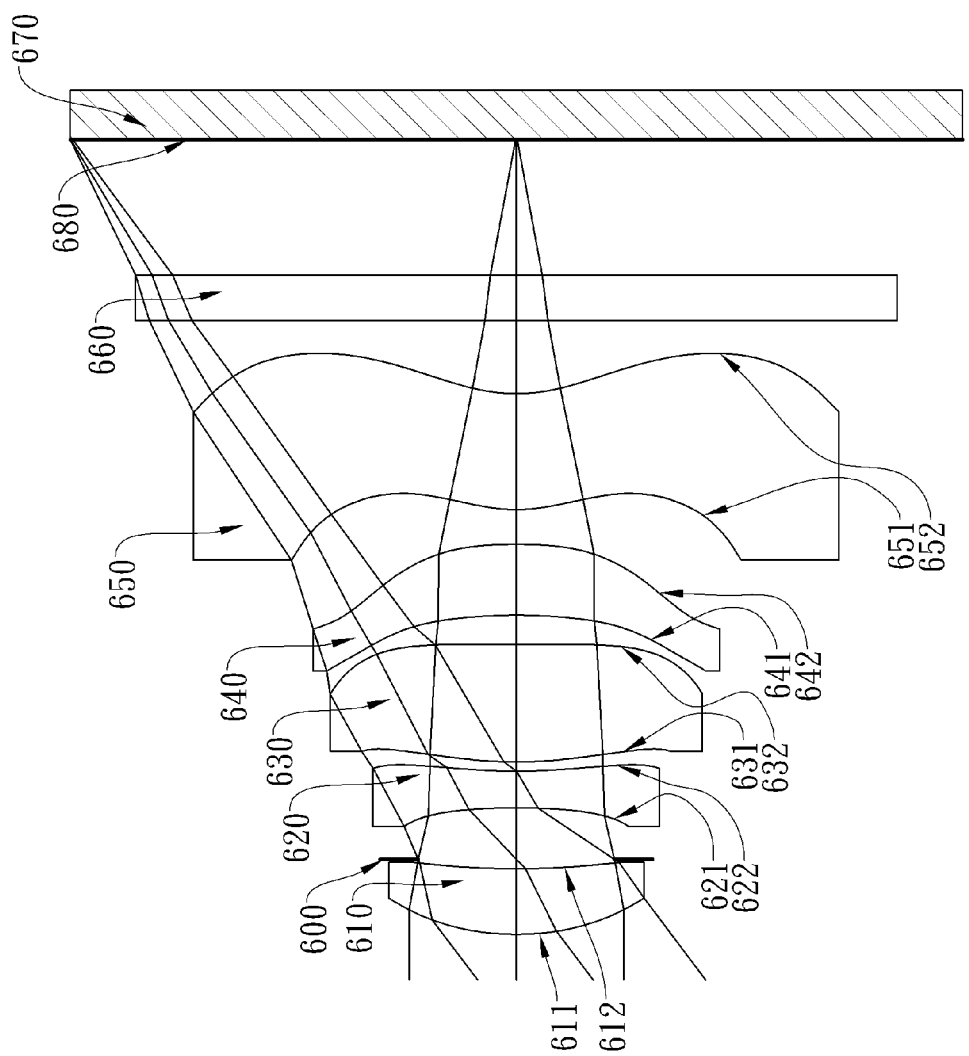
FIG. 6A is a schematic view of an image capturing lens system according to the 6th embodiment of the present disclosure.
Figure 6B:
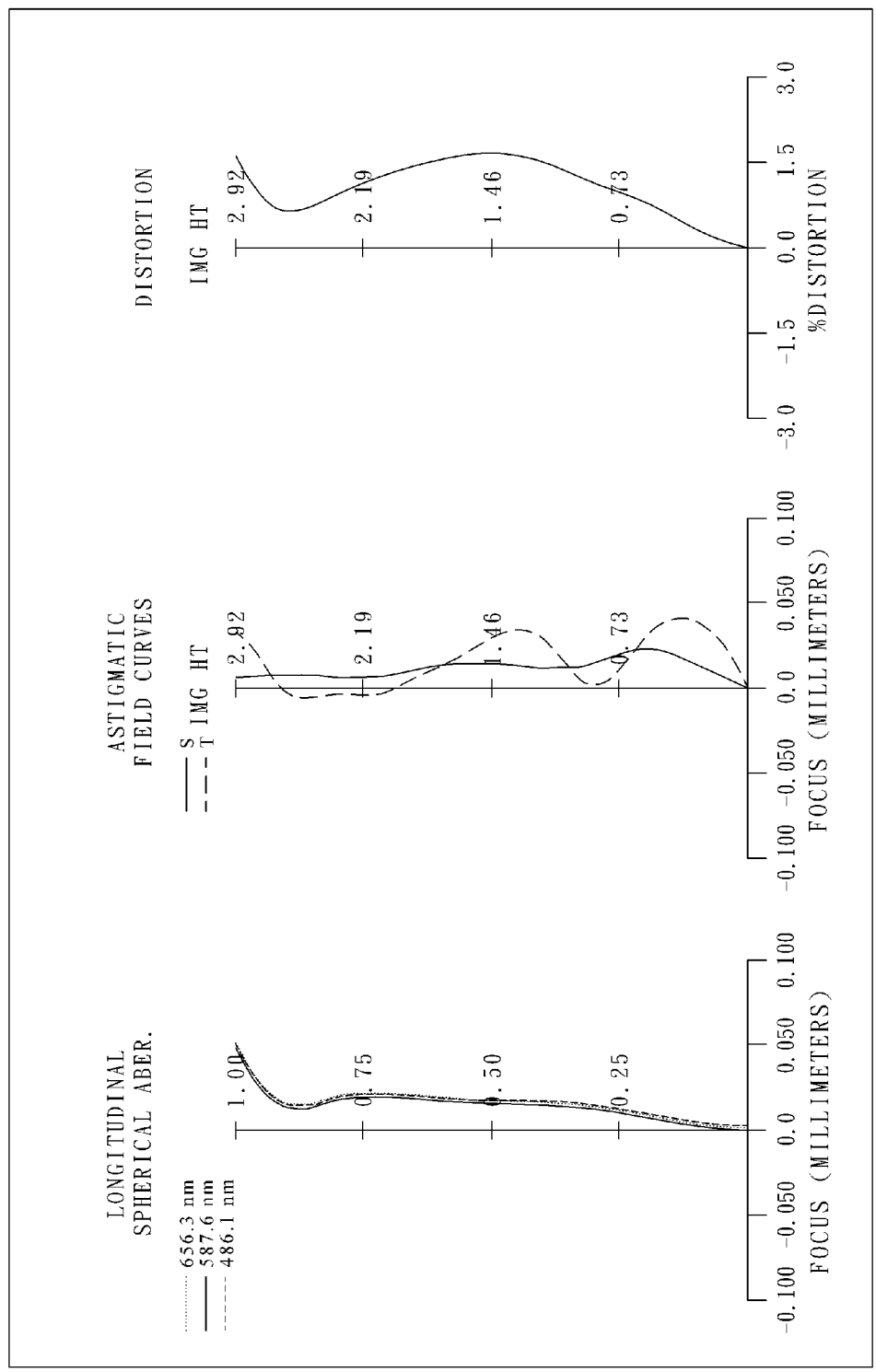
FIG. 6B shows spherical aberration curves, astigmatic field curves and a distortion curve of the image capturing lens system according to the 6th embodiment.

FIG. 6A is a schematic view of an image capturing lens system according to the 6th embodiment of the present disclosure. FIG. 6B shows spherical aberration curves, astigmatic field curves and a distortion curve of the image capturing lens system according to the 6th embodiment. In FIG. 6A, the image capturing lens system includes five non-cemented lens elements with refractive power, in order from an object side to an image side, the first lens element 610, an aperture stop 600, the second lens element 620, the third lens element 630, the fourth lens element 640, the fifth lens element 650, an IR-cut filter 660, an image plane 680 and an image sensor 670.

The first lens element 610 with positive refractive power has a convex object-side surface 611 in a paraxial region thereof and a concave image-side surface 612 in a paraxial region thereof, and is made of glass material. The object-side surface 611 and the image-side surface 612 of the first lens element 610 are aspheric.

The second lens element 620 with negative refractive power has a concave object-side surface 621 in a paraxial region thereof and a concave image-side surface 622 in a paraxial region thereof, and is made of plastic material. The object-side surface 621 and the image-side surface 622 of the second lens element 620 are aspheric, wherein the image-side surface 622 of the second lens element 620 has at least one convex shape in an off-axis region thereof.

The third lens element 630 with positive refractive power has a convex object-side surface 631 in a paraxial region thereof and a concave image-side surface 632 in a paraxial region thereof, and is made of plastic material. The object-side surface 631 and the image-side surface 632 of the third lens element 630 are aspheric, wherein the object-side surface 631 of the third lens element 630 has at least one concave shape in an off-axis region thereof.

The fourth lens element 640 with negative refractive power has a concave object-side surface 641 in a paraxial region thereof and a convex image-side surface 642 in a paraxial region thereof, and is made of plastic material. The object-side surface 641 and the image-side surface 642 of the fourth lens element 640 are aspheric.

The fifth lens element 650 with positive refractive power has a convex object-side surface 651 in a paraxial region thereof and a concave image-side surface 652 in a paraxial region thereof, and is made of plastic material. The object-side surface 651 and the image-side surface 652 of the fifth lens element 650 are aspheric. Furthermore, the fifth lens element 650 has at least one inflection point formed on the image-side surface 652 thereof.

The IR-cut filter 660 is made of glass and located between the fifth lens element 650 and the image plane 680, and will not affect the focal length of the image capturing lens system. Moreover, the image capturing lens system further includes an image sensor 670 located on the image plane 680.

The detailed optical data of the 6th embodiment are shown in Table 11 and the aspheric surface data are shown in Table 12 below.

TABLE 11

6th Embodiment
f = 3.80 mm, Fno = 2.70, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.703 | ASP | 0.430 | Glass | 1.566 | 61.1 | 4.25 |
| 2 | | 5.309 | ASP | 0.062 | | | | |
| 3 | Ape. Stop | Plano | | 0.338 | | | | |
| 4 | Lens 2 | −4.829 | ASP | 0.240 | Plastic | 1.607 | 26.6 | −3.18 |
| 5 | | 3.277 | ASP | 0.061 | | | | |
| 6 | Lens 3 | 2.536 | ASP | 0.771 | Plastic | 1.544 | 55.9 | 4.72 |
| 7 | | 167.118 | ASP | 0.192 | | | | |
| 8 | Lens 4 | −3.635 | ASP | 0.464 | Plastic | 1.544 | 55.9 | −106.00 |
| 9 | | −4.054 | ASP | 0.229 | | | | |
| 10 | Lens 5 | 1.040 | ASP | 0.760 | Plastic | 1.535 | 55.7 | 7.41 |
| 11 | | 1.050 | ASP | 0.480 | | | | |
| 12 | IR-cut filter | Plano | | 0.300 | Glass | 1.517 | 64.2 | — |
| 13 | | Plano | | 0.888 | | | | |
| 14 | Image | Plano | | — | | | | |

Note:
Reference wavelength is 587.6 nm (d-line).

TABLE 12

Aspheric Coefficients

| Surface # | 1 | 2 | 4 | 5 | 6 |
|---|---|---|---|---|---|
| k = | −2.6774E+00 | 2.0000E+01 | 1.6732E+01 | −1.4289E+00 | −2.0138E+01 |
| A4 = | 1.0174E−01 | 5.7938E−03 | −1.1351E−01 | −2.1446E−01 | −4.0285E−02 |
| A6 = | 4.6276E−03 | −1.4820E−01 | −5.5451E−02 | 2.4079E−01 | 7.2736E−03 |
| A8 = | 1.6975E−03 | 8.8178E−01 | −6.1234E−02 | −1.8261E−01 | 3.9474E−02 |
| A10 = | 5.3116E−02 | −2.9733E+00 | 1.2307E−01 | 4.2685E−02 | −4.5331E−02 |
| A12 = | −3.5882E−02 | 4.1366E+00 | −3.5754E−01 | −9.9679E−02 | −1.9232E−02 |
| A14 = | −7.5019E−02 | −2.2531E+00 | −6.0922E−01 | 5.3445E−02 | |

| Surface # | 7 | 8 | 9 | 10 | 11 |
|---|---|---|---|---|---|
| k = | −9.0000E+01 | −6.1503E+00 | −7.1067E+00 | −5.7698E+00 | −2.7116E+00 |
| A4 = | −2.5105E−02 | −1.7413E−02 | −7.3460E−01 | −2.2978E+00 | −5.1496E+00 |
| A6 = | −9.9671E−02 | −6.4830E−02 | 1.3583E+00 | 4.7459E+00 | 1.3688E+01 |
| A8 = | 1.7754E−02 | −3.3286E−01 | −1.9369E+00 | −1.4120E+01 | −2.6968E+01 |
| A10 = | 9.0581E−03 | 5.4485E−01 | 1.5885E+00 | 3.2207E+01 | 3.7417E+01 |
| A12 = | −9.0113E−03 | −2.7414E−01 | −6.2652E−01 | −3.9551E+01 | −3.5239E+01 |
| A14 = | | 4.4221E−02 | 9.3434E−02 | 2.1542E+01 | 1.8683E+01 |
| A16 = | | | | −3.5634E+00 | −3.8883E+00 |

In the image capturing lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 3.80 | Sag21/CT2 | −0.51 |
| Fno | 2.70 | (R3 + R4)/(R3 − R4) | 0.19 |
| HFOV [deg.] | 37.0 | f1 [mm] | 4.25 |
| T12/CT2 | 1.67 | |f2| [mm] | 3.18 |
| (T23 + T34)/CT3 | 0.33 | f3 [mm] | 4.72 |
| CT3/CT4 | 1.66 | f/f4 | −0.04 |
| CT5/ΣCT | 0.29 | f1/f2 | −1.34 |
| ΣCT/Td | 0.75 | f3/f1 | 1.11 |
| SL/TTL | 0.90 | | |

7th Embodiment

Figure 7A:
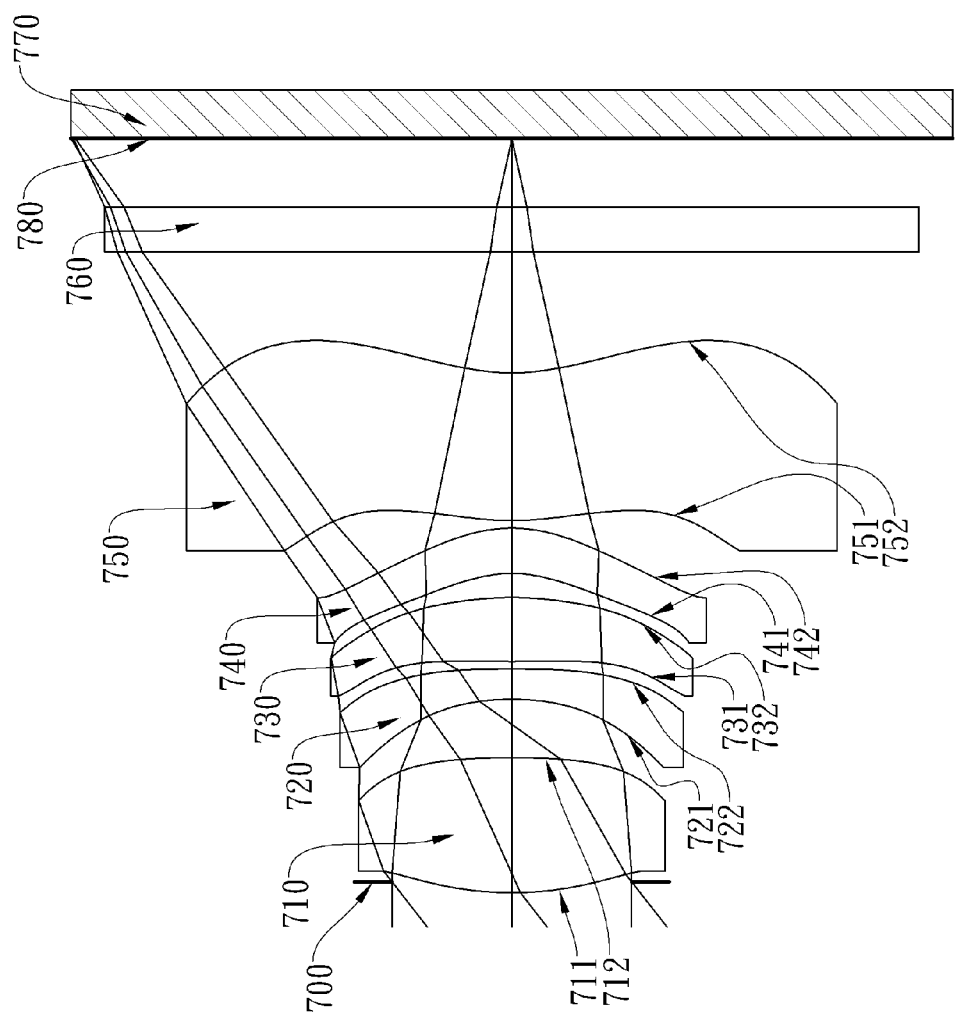
FIG. 7A is a schematic view of an image capturing lens system according to the 7th embodiment of the present disclosure.
Figure 7B:
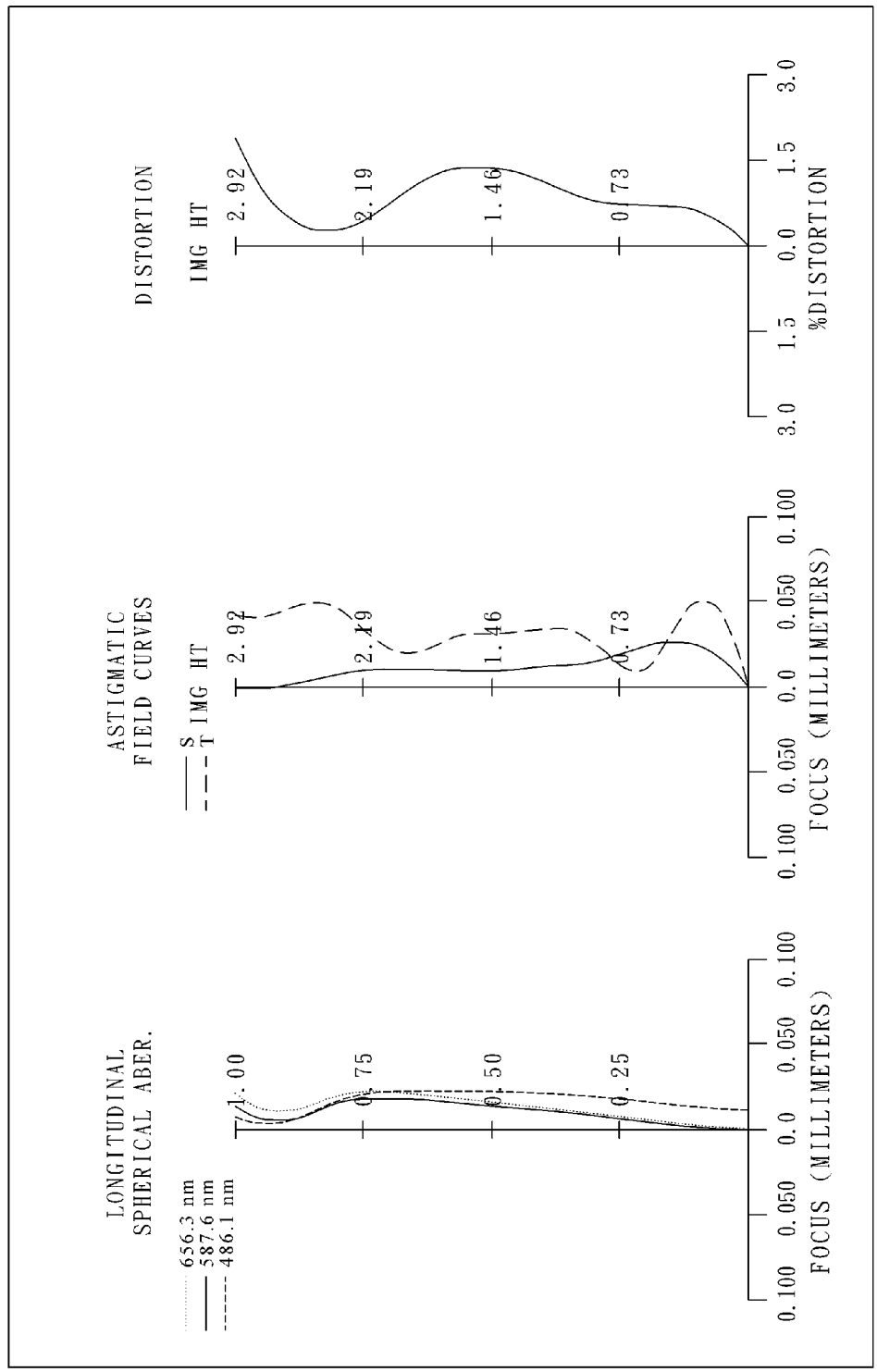
FIG. 7B shows spherical aberration curves, astigmatic field curves and a distortion curve of the image capturing lens system according to the 7th embodiment.

FIG. 7A is a schematic view of an image capturing lens system according to the 7th embodiment of the present disclosure. FIG. 7B shows spherical aberration curves, astigmatic field curves and a distortion curve of the image capturing lens system according to the 7th embodiment. In FIG. 7A, the image capturing lens system includes five non-cemented lens elements with refractive power, in order from an object side to an image side, an aperture stop 700, the first lens element 710, the second lens element 720, the third lens element 730, the fourth lens element 740, the fifth lens element 750, an IR-cut filter 760, an image plane 780 and an image sensor 770.

The first lens element 710 with positive refractive power has a convex object-side surface 711 in a paraxial region thereof and a convex image-side surface 712 in a paraxial region thereof, and is made of plastic material. The object-side surface 711 and the image-side surface 712 of the first lens element 710 are aspheric.

The second lens element 720 with negative refractive power has a concave object-side surface 721 in a paraxial region thereof and a convex image-side surface 722 in a paraxial region thereof, and is made of plastic material. The object-side surface 721 and the image-side surface 722 of the second lens element 720 are aspheric.

The third lens element 730 with positive refractive power has a convex object-side surface 731 in a paraxial region thereof and a convex image-side surface 732 in a paraxial region thereof, and is made of plastic material. The object-side surface 731 and the image-side surface 732 of the third lens element 730 are aspheric, wherein the object-side surface 731 of the third lens element 730 has at least one concave shape in an off-axis region thereof.

The fourth lens element 740 with negative refractive power has a concave object-side surface 741 in a paraxial region thereof and a convex image-side surface 742 in a paraxial region thereof, and is made of plastic material. The object-side surface 741 and the image-side surface 742 of the fourth lens element 740 are aspheric.

The fifth lens element 750 with negative refractive power has a convex object-side surface 751 in a paraxial region thereof and a concave image-side surface 752 in a paraxial region thereof, and is made of plastic material. The object-side surface 751 and the image-side surface 752 of the fifth lens element 750 are aspheric. Furthermore, the fifth lens element 750 has at least one inflection point formed on the image-side surface 752 thereof.

The IR-cut filter 760 is made of glass and located between the fifth lens element 750 and the image plane 780, and will not affect the focal length of the image capturing lens system. Moreover, the image capturing lens system further includes an image sensor 770 located on the image plane 780.

The detailed optical data of the 7th embodiment are shown in Table 13 and the aspheric surface data are shown in Table 14 below.

TABLE 13

7th Embodiment
f = 3.65 mm, Fno = 2.30, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.072 | | | | |
| 2 | Lens 1 | 2.143 | ASP | 0.896 | Plastic | 1.544 | 55.9 | 3.02 |
| 3 | | −6.023 | ASP | 0.388 | | | | |
| 4 | Lens 2 | −1.733 | ASP | 0.200 | Plastic | 1.650 | 21.4 | −2.93 |
| 5 | | −20.328 | ASP | 0.050 | | | | |
| 6 | Lens 3 | 11.790 | ASP | 0.425 | Plastic | 1.544 | 55.9 | 3.28 |
| 7 | | −2.074 | ASP | 0.161 | | | | |
| 8 | Lens 4 | −0.773 | ASP | 0.300 | Plastic | 1.650 | 21.4 | −34.01 |
| 9 | | −0.923 | ASP | 0.050 | | | | |
| 10 | Lens 5 | 1.888 | ASP | 0.980 | Plastic | 1.535 | 55.7 | −28.79 |
| 11 | | 1.378 | ASP | 0.800 | | | | |
| 12 | IR-cut filter | Plano | | 0.300 | Glass | 1.517 | 64.2 | — |
| 13 | | Plano | | 0.456 | | | | |
| 14 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | −9.3996E+00 | −1.0000E+00 | −1.1644E−02 | 2.0000E+01 | −9.0000E+01 |
| A4 = | 9.7147E−02 | −1.3946E−01 | −2.9747E−01 | −3.4060E−01 | −1.6735E−01 |
| A6 = | −1.2759E−01 | 1.9480E−02 | 3.3028E−01 | 5.1854E−01 | −6.1962E−02 |
| A8 = | 1.2436E−01 | −1.4808E−01 | −2.9853E−01 | −6.6846E−01 | 8.9029E−02 |
| A10 = | −2.6461E−01 | 1.2578E−01 | 2.1324E−01 | 6.0434E−01 | −8.5230E−02 |
| A12 = | 3.5910E−01 | −2.1420E−02 | −9.0155E−02 | −3.7549E−01 | 4.3622E−02 |
| A14 = | −2.5800E−01 | −2.2782E−02 | 1.5174E−02 | 1.0480E−01 | |

| Surface # | 7 | 8 | 9 | 10 | 11 |
|---|---|---|---|---|---|
| k = | −3.2118E+01 | −7.5436E+00 | −8.4031E+00 | −7.4427E−01 | −9.3362E+00 |
| A4 = | −8.6707E−02 | −2.1205E−01 | −5.5309E−01 | −4.7474E−01 | −2.8891E−02 |
| A6 = | −1.2013E−01 | 6.3296E−01 | 1.2639E+00 | 6.9006E−01 | −5.2235E−03 |
| A8 = | 5.9827E−02 | −8.4079E−01 | −1.4663E+00 | −8.3411E−01 | 4.9290E−04 |
| A10 = | 4.8157E−02 | 5.0262E−01 | 9.2382E−01 | 6.0346E−01 | 5.2612E−04 |
| A12 = | −2.9134E−02 | −9.1994E−02 | −3.0095E−01 | −2.5820E−01 | −1.9337E−04 |
| A14 = | | −2.0350E−02 | 4.1207E−02 | 6.1017E−02 | 2.4437E−05 |
| A16 = | | | | −6.0998E−03 | −1.0158E−06 |

In the image capturing lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 3.65 | Sag21/CT2 | −2.27 |
| Fno | 2.30 | (R3 + R4)/(R3 − R4) | −1.19 |
| HFOV [deg.] | 38.0 | f1 [mm] | 3.00 |
| T12/CT2 | 1.94 | |f2| [mm] | 2.93 |
| (T23 + T34)/CT3 | 0.50 | f3 [mm] | 3.28 |
| CT3/CT4 | 1.42 | f/f4 | −0.11 |
| CT5/ΣCT | 0.35 | f1/f2 | −1.02 |
| ΣCT/Td | 0.81 | f3/f1 | 1.09 |
| SL/TTL | 0.99 | | |

8th Embodiment

Figure 8A:
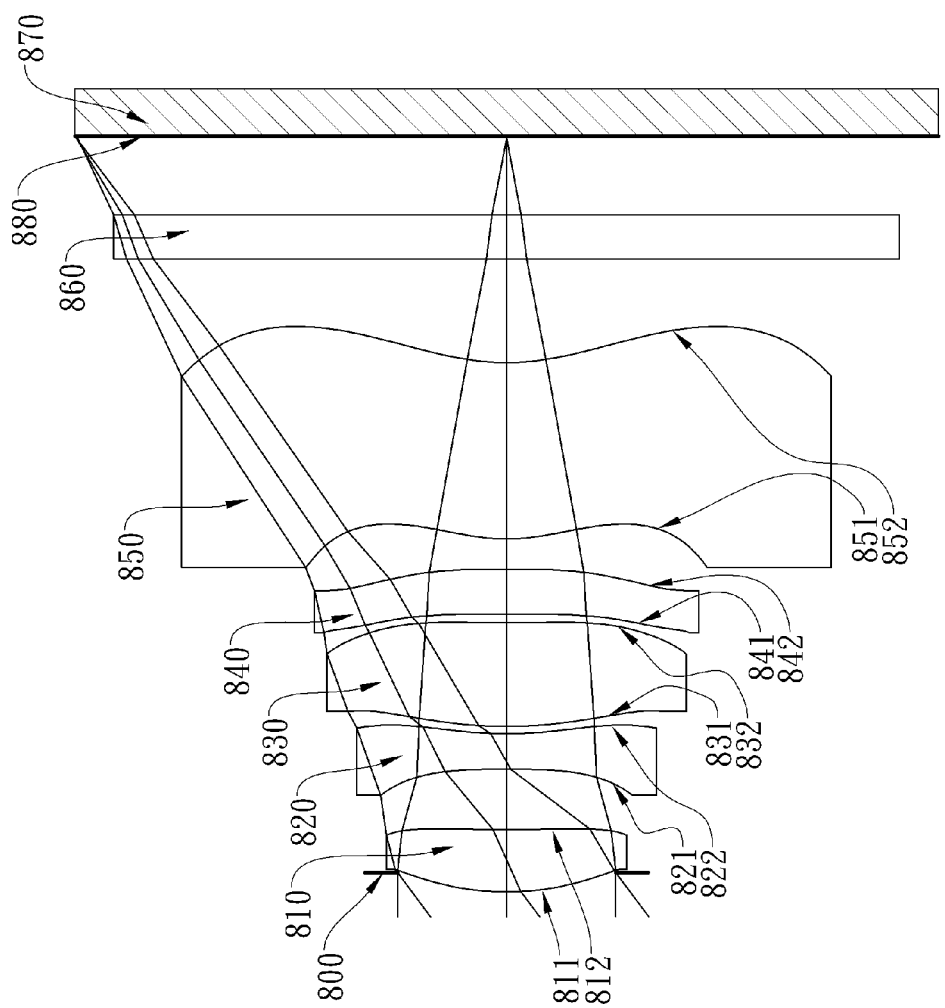
FIG. 8A is a schematic view of an image capturing lens system according to the 8th embodiment of the present disclosure.
Figure 8B:
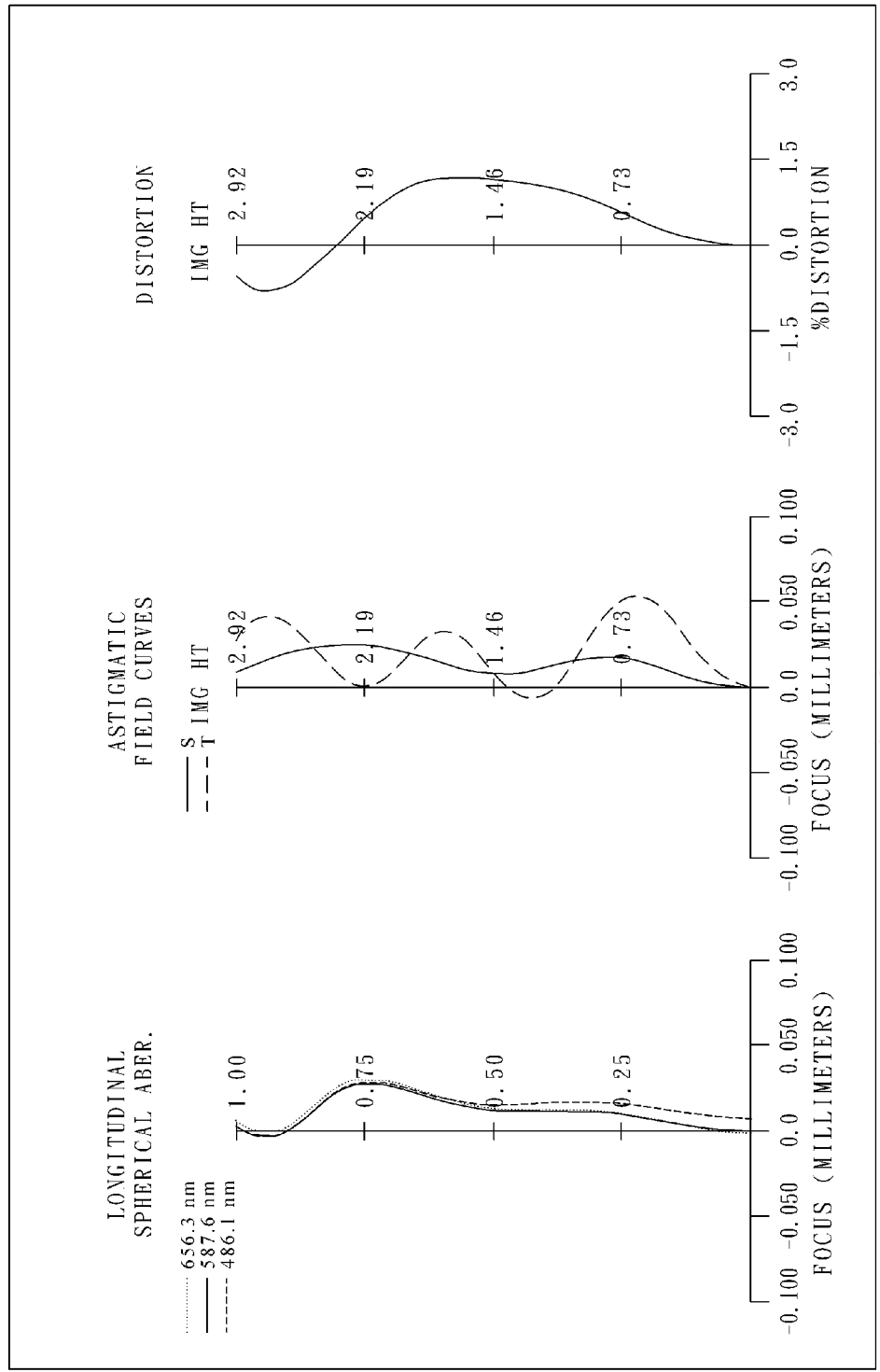
FIG. 8B shows spherical aberration curves, astigmatic field curves and a distortion curve of the image capturing lens system according to the 8th embodiment.

FIG. 8A is a schematic view of an image capturing lens system according to the 8th embodiment of the present disclosure. FIG. 8B shows spherical aberration curves, astigmatic field curves and a distortion curve of the image capturing lens system according to the 8th embodiment. In FIG. 8A, the image capturing lens system includes five non-cemented lens elements with refractive power, in order from an object side to an image side, an aperture stop 800, the first lens element 810, the second lens element 820, the third lens element 830, the fourth lens element 840, the fifth lens element 850, an IR-cut filter 860, an image plane 880 and an image sensor 870.

The first lens element 810 with positive refractive power has a convex object-side surface 811 in a paraxial region thereof and a concave image-side surface 812 in a paraxial region thereof, and is made of plastic material. The object-side surface 811 and the image-side surface 812 of the first lens element 810 are aspheric.

The second lens element 820 with negative refractive power has a concave object-side surface 821 in a paraxial region thereof and a concave image-side surface 822 in a paraxial region thereof, and is made of plastic material. The object-side surface 821 and the image-side surface 822 of the second lens element 820 are aspheric, wherein the image-side surface 822 of the second lens element 820 has at least one convex shape in an off-axis region thereof.

The third lens element 830 with positive refractive power has a convex object-side surface 831 in a paraxial region thereof and a concave image-side surface 832 in a paraxial region thereof, and is made of plastic material. The object-side surface 831 and the image-side surface 832 of the third lens element 830 are aspheric, wherein the object-side surface 831 of the third lens element 830 has at least one concave shape in an off-axis region thereof.

The fourth lens element 840 with negative refractive power has a concave object-side surface 841 in a paraxial region thereof and a concave image-side surface 842 in a paraxial region thereof, and is made of plastic material. The object-side surface 841 and the image-side surface 842 of the fourth lens element 840 are aspheric.

The fifth lens element 850 with positive refractive power has a convex object-side surface 851 in a paraxial region thereof and a concave image-side surface 852 in a paraxial region thereof, and is made of plastic material. The object-side surface 851 and the image-side surface 852 of the fifth lens element 850 are aspheric. Furthermore, the fifth lens element 850 has at least one inflection point formed on the image-side surface 852 thereof.

The IR-cut filter 860 is made of glass and located between the fifth lens element 850 and the image plane 880, and will not affect the focal length of the image capturing lens system. Moreover, the image capturing lens system further includes an image sensor 870 located on the image plane 880.

The detailed optical data of the 8th embodiment are shown in Table 15 and the aspheric surface data are shown in Table 16 below.

TABLE 15

8th Embodiment
f = 3.91 mm, Fno = 2.65, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.131 | | | | |
| 2 | Lens 1 | 1.802 | ASP | 0.422 | Plastic | 1.544 | 55.9 | 3.80 |
| 3 | | 12.822 | ASP | 0.410 | | | | |
| 4 | Lens 2 | −10.117 | ASP | 0.240 | Plastic | 1.607 | 26.6 | −3.14 |
| 5 | | 2.375 | ASP | 0.050 | | | | |
| 6 | Lens 3 | 2.828 | ASP | 0.702 | Plastic | 1.544 | 55.9 | 6.98 |
| 7 | | 10.104 | ASP | 0.060 | | | | |
| 8 | Lens 4 | −64.580 | ASP | 0.300 | Plastic | 1.633 | 23.4 | 17.75 |
| 9 | | 13.620 | ASP | 0.208 | | | | |
| 10 | Lens 5 | 1.221 | ASP | 1.196 | Plastic | 1.535 | 55.7 | 4.57 |
| 11 | | 1.606 | ASP | 0.700 | | | | |
| 12 | IR-cut filter | Plano | | 0.300 | Glass | 1.517 | 64.2 | — |
| 13 | | Plano | | 0.533 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | −4.3575E+00 | −1.2132E+01 | 2.0000E+01 | −1.8502E+00 | −2.4320E+01 |
| A4 = | 8.5066E−02 | −4.9456E−02 | −2.6334E−02 | −2.4077E−01 | 3.7701E−02 |
| A6 = | −3.4093E−02 | −2.2792E−01 | −4.6761E−02 | 1.8208E−01 | −9.8506E−03 |
| A8 = | −1.1248E−01 | 1.0177E+00 | 1.7534E−01 | −1.6445E−01 | −1.5352E−02 |
| A10 = | 2.9964E−02 | −3.0951E+00 | 3.1401E−02 | 9.8297E−02 | −6.5521E−02 |
| A12 = | 3.6627E−01 | 4.1366E+00 | −5.5780E−01 | −9.6794E−02 | 4.0055E−02 |
| A14 = | −5.9698E−01 | −2.2531E+00 | 4.2202E−01 | 6.0114E−02 | |

| Surface # | 7 | 8 | 9 | 10 | 11 |
|---|---|---|---|---|---|
| k = | −9.0000E+01 | −4.7677E+01 | 9.4722E+00 | −2.4567E+00 | −1.2689E+00 |
| A4 = | −1.6354E−01 | −1.8369E−01 | −6.1962E−01 | −5.8770E−01 | −1.5244E−01 |
| A6 = | −5.9952E−03 | 3.9693E−01 | 1.2770E−01 | 8.1753E−01 | 5.8645E−02 |
| A8 = | 3.9544E−02 | −8.0838E−01 | −1.6362E+00 | −9.3900E−01 | −2.0344E−02 |
| A10 = | 8.1250E−03 | 8.5065E−01 | 1.2241E+00 | 6.6862E−01 | 5.0560E−03 |
| A12 = | −1.3284E−02 | −3.9699E−01 | −4.6748E−01 | −2.7567E−01 | −8.3112E−04 |
| A14 = | | 6.5395E−02 | 7.0112E−02 | 5.5585E−02 | 7.6174E−05 |
| A16 = | | | | −3.5596E−03 | −2.8115E−06 |

In the image capturing lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 3.91 | Sag21/CT2 | −0.74 |
| Fno | 2.65 | (R3 + R4)/(R3 − R4) | 0.62 |
| HFOV [deg.] | 36.8 | f1 [mm] | 3.80 |
| T12/CT2 | 1.71 | \|f2\| [mm] | 3.14 |
| (T23 + T34)/CT3 | 0.16 | f3 [mm] | 6.98 |
| CT3/CT4 | 2.34 | f/f4 | −0.22 |
| CT5/ΣCT | 0.42 | f1/f2 | −1.21 |
| ΣCT/Td | 0.80 | f3/f1 | 1.84 |
| SL/TTL | 0.97 | | |

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising five non-cemented lens elements with refractive power, in order from an object side to an image side:
    a first lens element with positive refractive power having a convex object-side surface in a paraxial region thereof;
    a second lens element having negative refractive power;
    a third lens element having positive refractive power;
    a fourth lens element with negative refractive power having a concave object-side surface in a paraxial region thereof; and
    a fifth lens element with refractive power having a concave image-side surface in a paraxial region thereof, wherein an object-side surface and the image-side surface of the fifth lens element are aspheric, and the fifth lens element has at least one inflection point formed on the image-side surface of the fifth lens element;
    wherein the image capturing lens system has a total of five lens elements with refractive power, a focal length of the second lens element is f2, a focal length of the first lens element is f1, a focal length of the third lens element is f3, a central thickness of the third lens element is CT3, a central thickness of the fourth lens element is CT4, and the following conditions are satisfied:

$|f2|<f1<f3$; and $1.35<CT3/CT4<5.0$.

2. The image capturing lens system of claim 1, wherein the fifth lens element has a convex object-side surface in a paraxial region thereof.

3. The image capturing lens system of claim 2, wherein a sum of the central thicknesses from the first through fifth lens elements is ΣCT, an axial distance between the object-side surface of the first lens element and the image-side surface of the fifth lens element is Td, and the following condition is satisfied:

$0.67<\Sigma CT/Td<0.90$.

4. The image capturing lens system of claim 3, wherein an axial distance between the second lens element and the third lens element is T23, an axial distance between the third lens element and the fourth lens element is T34, the central thickness of the third lens element is CT3, and the following condition is satisfied:

$0.15<(T23+T34)/CT3<0.80$.

5. The image capturing lens system of claim 3, wherein the fourth lens element has a convex image-side surface in a paraxial region thereof.

6. The image capturing lens system of claim 3, wherein a central thickness of the fifth lens element is CT5, the sum of the central thicknesses from the first through fifth lens elements is ΣCT, and the following condition is satisfied:

$0.25<CT5/\Sigma CT<0.45$.

7. The image capturing lens system of claim 3, wherein the image capturing lens system further includes a stop disposed between an imaged object and the second lens element, an axial distance between the stop and an image plane is SL, an axial distance between the object-side surface of the first lens element and the image plane is TTL, and the following condition is satisfied:

$0.8<SL/TTL<1.2$.

8. The image capturing lens system of claim 3, wherein the second lens element has a concave image-side surface in a paraxial region thereof and the image-side surface of the second lens element has at least one convex shape in an off-axis region thereof.

9. The image capturing lens system of claim 2, wherein a curvature radius of the object-side surface of the second lens element is R3, a curvature radius of the image-side surface of the second lens element is R4, and the following condition is satisfied:

$-2.0<(R3+R4)/(R3-R4)<1.5$.

10. The image capturing lens system of claim 9, wherein the third lens element has a convex object-side surface in a paraxial region thereof and the object-side surface of the third lens element has at least one concave shape in an off-axis region thereof.

11. The image capturing lens system of claim 9, wherein the central thickness of the third lens element is CT3, the central thickness of the fourth lens element is CT4, and the following condition is satisfied:

$1.5<CT3/CT4<3.0$.

12. The image capturing lens system of claim 1, wherein a focal length of the image capturing lens system is f, a focal length of the fourth lens element is f4, and the following condition is satisfied:

$-0.6<f/f4<0$.

13. The image capturing lens system of claim 12, wherein a distance in parallel with an optical axis from an axial vertex on the object-side surface of the second lens element to a maximum effective diameter position on the object-side surface of the second lens element is Sag21, a central thickness of the second lens element is CT2, the following condition is satisfied:

$-3.0<Sag21/CT2<-0.3$.

14. The image capturing lens system of claim 12, wherein both of the object-side surface and the image-side surface of the first through fifth lens elements are aspheric and made of plastic material.

15. The image capturing lens system of claim 14, wherein an axial distance between the first lens element and the second lens element is T12, a central thickness of the second lens element is CT2, and the following condition is satisfied:

1.0<*T*12/CT2<2.5.

16. The image capturing lens system of claim 1, wherein the focal length of the first lens element is f1, the focal length of the second lens element is f2, and the following condition is satisfied:

−1.8<*f*1/*f*2<−1.1.

17. The image capturing lens system of claim 1, wherein the focal length of the third lens element is f3, the focal length of the first lens element is f1, and the following condition is satisfied:

1.1<f3/f1<2.0.

18. An image capturing device, comprising the image capturing lens system as set forth herein in claim 1 and an image sensor.

\* \* \* \* \*